United States Patent [19]
Takeuchi et al.

[11] Patent Number: 5,944,405
[45] Date of Patent: *Aug. 31, 1999

[54] FLAT LIGHT SOURCE USING LIGHT-DIFFUSING SHEET WITH PROJECTIONS THEREON

[75] Inventors: Michiko Takeuchi; Toshikazu Nishio; Taiji Ishii, all of Tokyo-To, Japan

[73] Assignee: Dai Nippon Printing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/619,623
[22] PCT Filed: Aug. 11, 1995
[86] PCT No.: PCT/JP95/01608
§ 371 Date: May 30, 1996
§ 102(e) Date: May 30, 1996
[87] PCT Pub. No.: WO96/05466
PCT Pub. Date: Feb. 22, 1996

[30] Foreign Application Priority Data

Aug. 12, 1994 [JP] Japan .................................. 6-210694

[51] Int. Cl.$^6$ .................................................. F21V 7/04
[52] U.S. Cl. .............................................. 362/31; 362/551
[58] Field of Search .................................. 362/26, 31, 551

[56] References Cited

U.S. PATENT DOCUMENTS

| | | | |
|---|---|---|---|
| 4,729,067 | 3/1988 | Ohe | 362/26 |
| 4,729,068 | 3/1988 | Ohe | 362/26 |
| 4,775,222 | 10/1988 | Ohe | 362/26 |
| 4,998,804 | 3/1991 | Horiuchi | 362/26 |
| 5,262,928 | 11/1993 | Kashima et al. | 362/26 |
| 5,289,351 | 2/1994 | Kashima et al. | 362/26 |
| 5,408,388 | 4/1995 | Kobayashi et al. | 362/26 |
| 5,442,523 | 8/1995 | Kashima et al. | 362/26 |
| 5,467,208 | 11/1995 | Kokawa et al. | 362/26 |
| 5,467,417 | 11/1995 | Nakamura et al. | 362/26 |
| 5,521,725 | 5/1996 | Beeson et al. | 362/26 |
| 5,521,797 | 5/1996 | Kashima et al. | 362/26 |
| 5,572,411 | 11/1996 | Watai et al. | 362/31 |
| 5,598,280 | 1/1997 | Nishio et al. | 362/31 |
| 5,641,219 | 6/1997 | Mizobe | 362/26 |

FOREIGN PATENT DOCUMENTS

| | | |
|---|---|---|
| 55-162201 | 9/1980 | Japan . |
| 61-55684 | 3/1986 | Japan . |
| 62-3226 | 1/1987 | Japan . |
| 1-112202 | 4/1989 | Japan . |
| 1-245220 | 9/1989 | Japan . |
| 3-9306 | 1/1991 | Japan . |
| 4-107201 | 9/1992 | Japan . |
| 5-196940 | 8/1993 | Japan . |
| 6-15008 | 2/1994 | Japan . |

*Primary Examiner*—Sandra O'Shea
*Assistant Examiner*—Marshall Honeyman
*Attorney, Agent, or Firm*—Parkhurst & Wendel LLP

[57] ABSTRACT

A flat light source used as back-lighting for a liquid crystal display device includes an optically conductive plate (1) having a light reflecting layer (2), and a light source (3). A light-diffusing sheet (8) is provided outside the optically conductive plate (1) opposite to the light reflecting layer (2). A lens sheet (4) is provided outside the light-diffusing sheet (8), with a transmission type of display element (6) provided on the outer side of the lens sheet (4). The light-diffusing sheet (8) is formed of a transparent material free from light-diffusing agent particles and has minute irregularities (41) formed at random on the front surface thereof. The irregularities are of a surface roughness that is at least the wavelength of the light from the light source, but is no more than 100 $\mu$m. When the percentage of the cumulative frequency distribution of the heights of the minute irregularities are plotted along the Y-axis and the heights of these minute irregularities are plotted along the X-axis, the cumulative frequency distribution curve has a convex portion oriented towards the lower side of the coordinates and the average value of the heights of the minute irregularities is greater than the median value thereof. Thus, a flat light source is provided which emits highly luminant light uniformly within a predetermined angular range, and which has no local differences in intensity over the surface thereof.

11 Claims, 20 Drawing Sheets

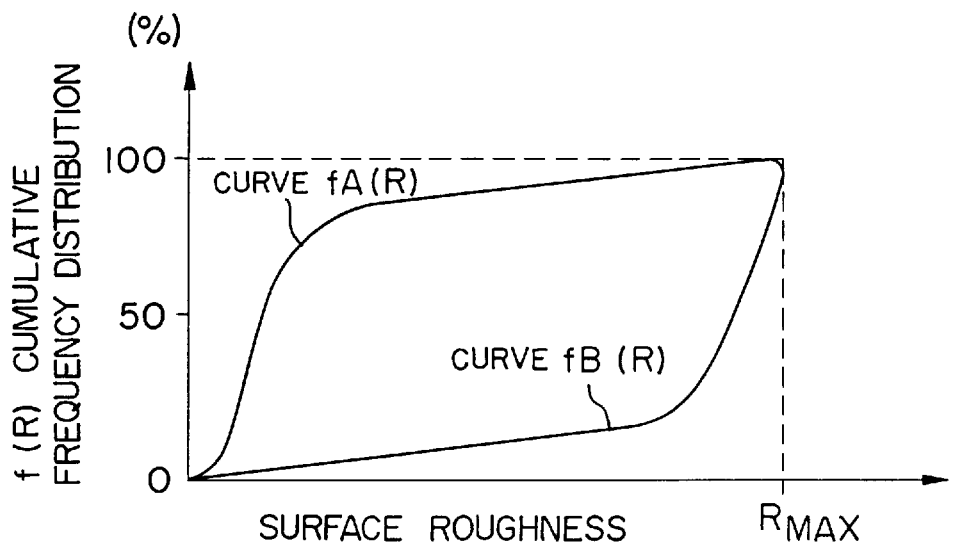
F I G. 17
F I G. 18
F I G. 19
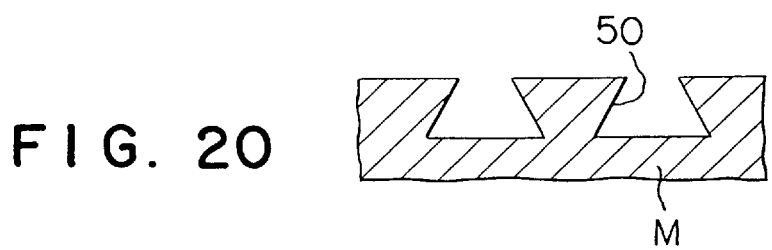
F I G. 20

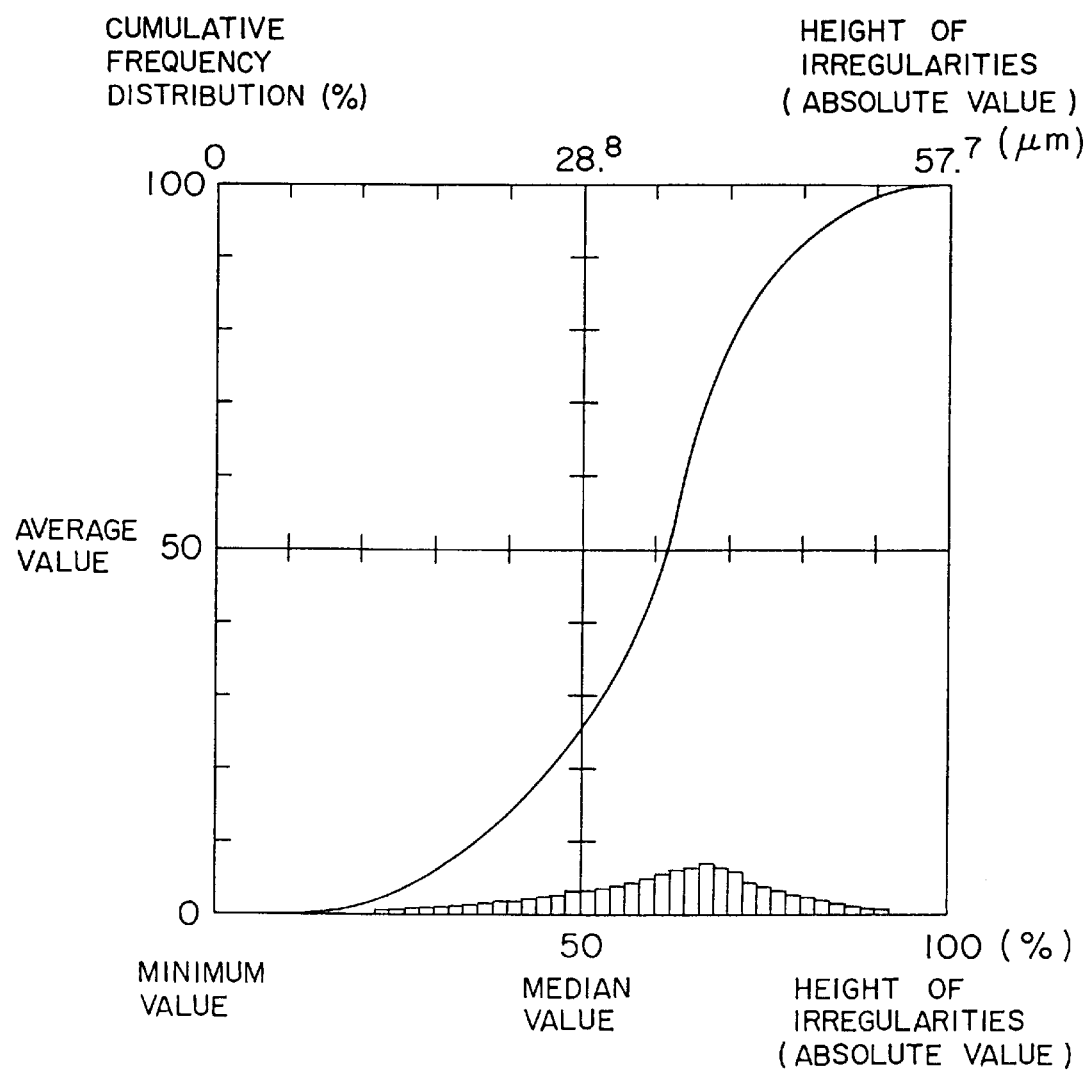
F I G. 21

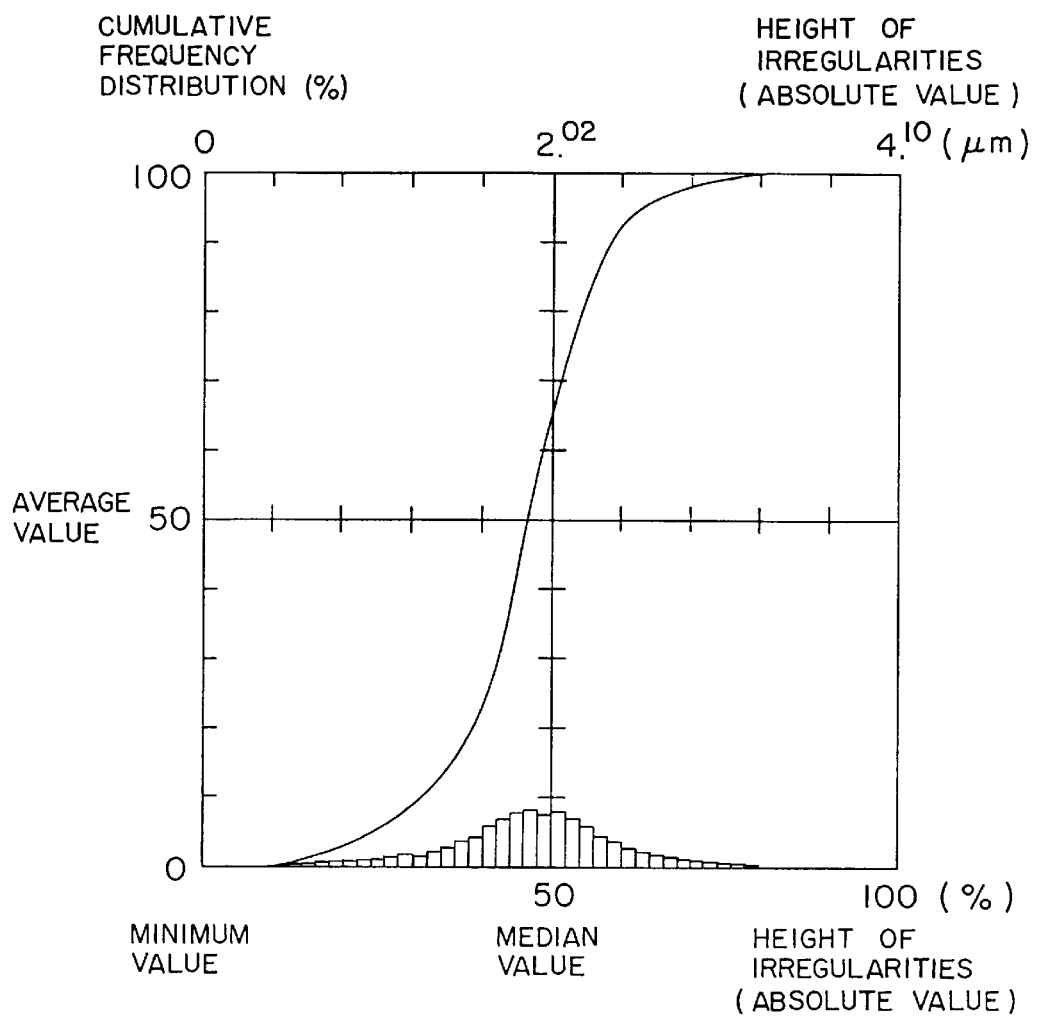
F I G. 29

FIG. 30  MAGNIFICATION  X:100, Y:100, Z:1000

FLAT LIGHT SOURCE USING LIGHT-DIFFUSING SHEET WITH PROJECTIONS THEREON

TECHNICAL FIELD

The present invention relates to a flat light source that can be used in applications such as back-lighting for a light transmissive type of display device such as a liquid crystal display device, an illuminated advertisement, or a traffic sign. In particular, it relates to a flat light source that uses a light-diffusing sheet.

BACKGROUND OF THE INVENTION

Flat light sources that are used for back-lighting in devices such as liquid crystal displays (LCDs) are known in the art, as described below.

A first known type of flat light source is an edge-lit system that uses a flat optically transmissive plate as an optically conductive member. The flat light source used in this system causes light to be incident on one or both side edge surfaces of the optically conductive member which is formed of a transparent flat plate. Total reflection within the flat optically transmissive plate is utilized to propagate the light throughout the entire optically conductive plate. Part of the thus propagated light becomes diffused reflected light of less than the critical angle from a light-scattering reflective plate on the rear surface of the optically conductive plate, and thus diffused light is emitted from the outer surface of the optically conductive plate (refer to Japanese Utility Model Laid Open No. 55-162,201).

A second known type of flat light source has a lens sheet wherein one surface has projections and the other surface is smooth, which is placed with the projection side thereof on the outer surface of the optically conductive plate of the flat light source of the above first type. The light-focusing action of this lens is utilized to ensure that the diffused, reflected light is diffused uniformly and isotropically within a predetermined angular range (refer to Japanese Utility Model Laid Open No. 4-107,201).

The above described lens sheet could be used in combination with a frosted transparent diffusion plate (a frosted transparent sheet) formed by dispersing particles of a light-diffusing agent such as $TiO_2$ within a transparent plastic. In such a case, the optical energy of the light source is distributed in a more concentrated manner within a predetermined limited angular range, than when a frosted transparent diffusion plate alone is placed over the optically conductive plate (refer to U.S. Pat. No. 4,729,067 and Japanese Patent Laid Open No. 61-55,684). Moreover, a uniform and highly isotropic diffused light can be obtained within this angular range.

However, both of the above prior-art techniques have problems. The first one simply places a light-scattering reflective plate on the rear surface of the optically conductive plate so that the emitted light has a comparatively sharp distribution that peaks at an angle of 60 degrees to the normal of the surface of the optically conductive plate. Therefore a phenomenon is observed in which the degree of luminance is insufficient in the normal direction (the forward direction) where brightness is most required, while optical energy is wasted in the lateral directions where it is completely unnecessary.

The second prior-art technique has a problem in that, when a lenticular sheet that comprises an array of a large number of individual triangular prismatic lenses is superimposed on the light-emitting surface of the optically conductive plate as the lens sheet, the ratio of optical energy emitted within angles between 30 and 60 degrees from the normal to the light-emitting surface is comparatively high, but even if the portion within 2 to 4 cm of the side edge portion of the optically conductive plate is very bright, the luminance drops gradually further away from this portion so that the edge at the opposite side from the light source is noticeably darker.

If a frosted transparent scattering diffusion plate is used, a further problem arises in that the particles of light-diffusing agent within the optically conductive plate absorb some of the light, so that the optical energy thereof is lost.

In addition, interference patterns such as Newton's rings could be generated by the optical seal between the lens sheet and the surface of the optically conductive plate.

Techniques that have been tried to solve these problems include:

1. An attempt to correct and make uniform the luminance distribution within the surface of the optically conductive plate by creating a pattern in a light-scattering reflective layer on the rear surface of the optically conductive plate, such as a dot pattern, in such a manner that the surface area of the pattern is decreased closer to the light source and increased further away therefrom, as disclosed in Japanese Patent Laid-Open No. 1-245,220 and Japanese Utility Model Laid-Open No. 6-15,008.

2. An attempt to correct and make uniform the luminance distribution within the surface of the optically conductive plate by disposing two or more light sources at the side edge portions of the optically conductive plate, as disclosed in Japanese Patent Laid-Open No. 3-9306.

3. An attempt to obtain a directed output light that has a substantially uniform luminance from the entire surface of the optically conductive plate, by providing a linear prismatic array (an array of prismatic lenses) that partially reflects and partially passes light on either the front or rear surface of the optically conductive plate, and varying the angle of inclination of the surfaces of these prisms and locally varying the thickness of the optically conductive plate, as disclosed in Japanese Patent Laid-Open No. 62-3226.

All of the above measures, and others, have problems in that it is difficult to provide a completely uniform luminance thereby. In addition, technique 1 has a further problem in that the dot pattern of the light-scattering reflective layer is visible from the side from which light is emitted. Technique 2 has a further problem in that the space required for the entire light source and the power consumption thereof are more than doubled.

Technique 3 has problems in that the form of the optically conductive plate is complicated, the fabrication of this design is extremely difficult, and it is also difficult to make the dot pattern of the light-scattering reflective layer invisible.

An objective of the present invention is therefore to solve the above problems with the prior art and provide a flat light source that implements a uniform and very bright light that is limited to a predetermined angular range, and that has no variations in luminance due to position within the light surface, without increasing the power consumption, amount of heat generated, or the size of the entire apparatus.

DISCLOSURE OF THE INVENTION

The present invention achieves the above objective by providing a flat light source that uses a light-diffusing sheet formed of a transparent material containing no particles of a light-diffusing agent. The front surface of this light-diffusing sheet has minute irregularities formed at random; these minute irregularities have a surface roughness of at least the wavelength of the light from the light source, but no more than 100 μm; and, when a cumulative frequency distribution curve of the heights of the minute irregularities is plotted, with the percentage of the cumulative frequency distribution of the heights of these irregularities along the Y-axis and the heights of the minute irregularities along the X-axis, the cumulative frequency distribution curve has a convex portion oriented towards a lower side of coordinates and the average value of the heights of the minute irregularities is greater than a median value thereof.

A light source is disposed along at least one side edge surface of this light-diffusing sheet, and the light-diffusing sheet can be provided superimposed on a light-emitting surface of an optically conductive member that is a flat optically transmissive plate, or an optically conductive member that has a rectangular cavity therein, where the optically conductive member has a light-reflecting layer on the rear surface thereof.

The light-diffusing sheet may also be provided in such a manner as to cover a window in a lamp housing. This lamp housing is configured to contain a light source, light-reflecting wall surfaces of the lamp housing cover the rear and side surfaces of the light source, and the window is formed in the front surface of the light source.

When the above described optically conductive member is formed of a flat, optically transmissive plate, the front surface of the optically conductive member may be a flat surface having a surface roughness less than the wavelength of the light of the light source.

A sheet that is a one-dimensional or two-dimensional array of convex or concave lenses may be superimposed over the light-diffusing sheet. Similarly, another, identical light-diffusing sheet may be superimposed over the first light-diffusing sheet.

BRIEF DESCRIPTION OF THE DRAWINGS

FIG. 17 is a graph of cumulative frequency distribution f(R), with surface roughness (that is, the percentage of cumulative frequency distribution of depths R of concavities in the mold) plotted along the X-axis and with surface roughness (that is, the depths R of the concavities in the mold) plotted along the Y-axis, in a fabrication mold for imprinting projections of the light-diffusing sheet in accordance with the present invention;

FIG. 18 is a sectional view of a fabrication mold having the characteristic of the cumulative frequency distribution curve fA(R) in FIG. 17;

FIG. 19 is a is a sectional view of a fabrication mold having the characteristic of the cumulative frequency distribution curve fB(R) in FIG. 17;

FIG. 20 is a sectional view illustrating undercutting formed by aggregations of minute spherical particles of the metal chrome, during the matte-plating of chrome onto the indented surface of the roll mold used for fabrication;

FIG. 21 shows a graph relating to the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) along the Y-axis, in a case in which the cumulative frequency distribution curve has a downward convexity and a relationship (average value ≧ median value) is satisfied;

FIG. 29 is a graph showing the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) plotted along the Y-axis, in a case in which the cumulative frequency distribution curve has a partial upwardly convex portion and a partial downwardly convex portion, and the average value is less than the median value.

BEST MODES FOR CARRYING OUT THE INVENTION

Embodiments of a flat light source in accordance with the present invention and a display device using this flat light source will be described below with reference to the accompanying drawings.

Figure 1:
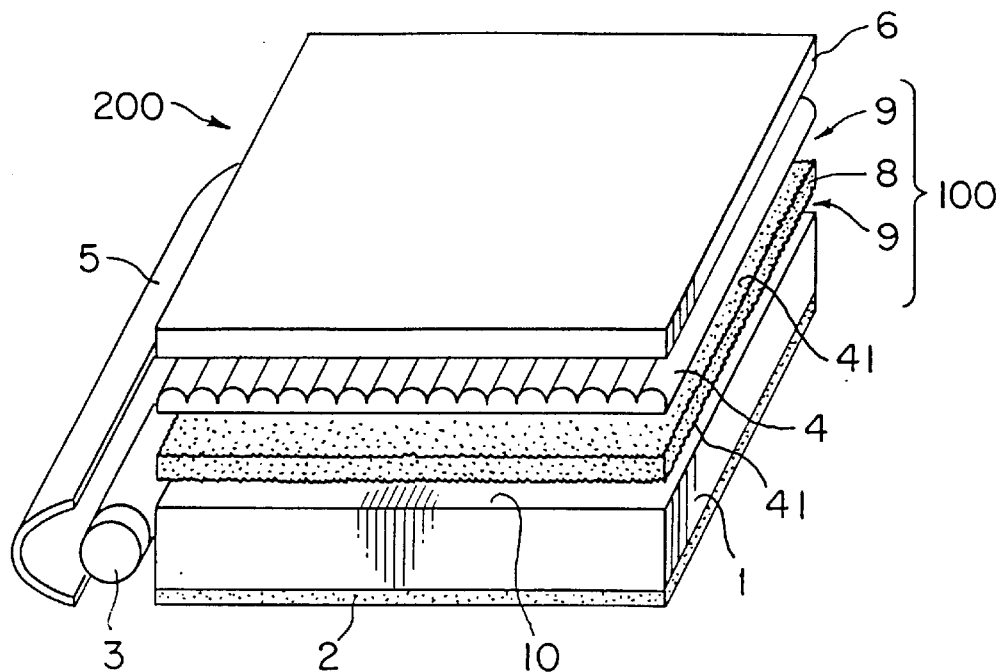
FIG. 1 is a perspective view of an example of a transmissive type of display device using an edge-lit type of flat light source in accordance with this invention.

An edge-lit type of flat light source is shown in FIG. 1. In this figure, reference numeral 1 denotes an optically conductive plate, where this optically conductive plate 1 is configured of a solid optically transmissive flat plate. A light source such as a linear light source 3 is provided along one edge surface of this optically conductive plate 1. A reflective mirror 5 is provided behind the light source 3. Light emitted from the light source 3 enters the interior of the optically conductive plate 1 either directly or after being reflected by the reflective mirror (also a lamp housing with reflective surfaces) 5. It is reflected internally as shown for example in FIG. 3 or it is emitted directly outside from within the optically conductive plate 1. A light reflecting layer 2 is provided on the rear surface of the optically conductive plate 1. The surface of the optically conductive plate 1 opposite to the light reflecting layer 2 forms a light-emitting surface. A light-diffusing sheet 8 is provided facing this light-emitting surface, and light emitted through the light-emitting surface passes through the light-diffusing sheet 8. Light that has passed through the light-diffusing sheet 8 passes through a lens sheet 4 and then reaches a transmission type display device 6. A gap 9 is formed between the light-diffusing sheet 8 and the optically conductive plate 1, and between the light-diffusing sheet 8 and the lens sheet 4. Projections 41 that will be described in more detail later are formed on the surfaces of the light-diffusing sheet 8 facing these gaps 9.

Instead of being solid, the optically conductive plate 1 could have an empty structure. In such a case, the light-emitting surface of the solid optically conductive plate 1 and the surface thereof in contact with the light reflecting layer 2 would each be in the form of a flat plate, with the space therebetween forming a rectangular cavity.

Figure 2:
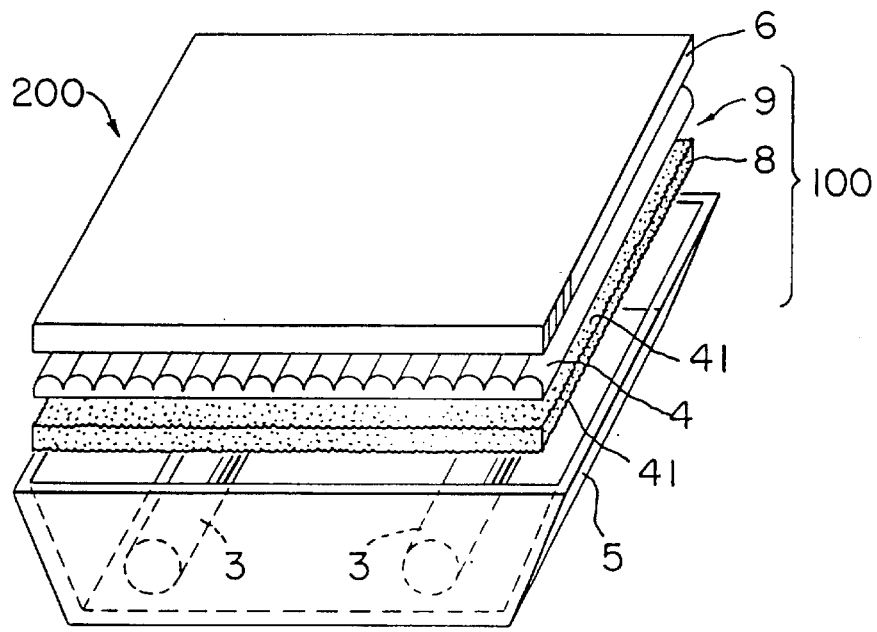
FIG. 2 is a perspective view of an example of a transmissive type of display device using a back-lit type of flat light source in accordance with this invention.

With a back-lit light source as shown in FIG. 2, the light source 3 is a linear or point light source and accommodated within a lamp housing 5. The lamp housing 5 extends over the rear and sides of the light source 3 and acts as reflective surfaces for reflecting the light from the light source 3 in the direction of the light-diffusing sheet 8.

In FIGS. 1 and 2, reference number 100 denotes a flat light source in its entirety and reference number 200 denotes a display device in its entirety.

In accordance with this present invention, projections 41 are obtained by forming minute irregularities at random (such as in a sharkskin pattern or a pear skin pattern) over the entire surface of the light-diffusing sheet 8. These minute irregularities have a surface roughness that is at least the wavelength of the light emitted from the light source but is no more than 100 $\mu$m. When the percentages of the cumulative frequency distribution of the heights of the minute irregularities are plotted along the Y-axis and the heights of these minute irregularities along the X-axis, the cumulative frequency distribution curve should typically have a convex portion oriented towards the lower side of the coordinates and the average value of the height of the minute irregularities should be greater than the median thereof.

The light-diffusing sheet 8 used by the present invention is formed from a transparent material. In this case, the transparent material may be a (meth)acrylic ester such as polymethyl (meth)acrylate or polyethyl (meth)acrylate [where "(meth)acrylate" means either methacrylate or acrylate throughout the specification] or a copolymer thereof; a polyester such as polyethylene terephthalate or polybutylene terephthalate; a thermoplastic resin such as a polycarbonate, polystyrene or polymethylpentene resin; an ultraviolet lightor electron beam-curable, transparent resin which has been crosslinked and cured by ultraviolet rays or electron beams; a transparent glass; or a transparent ceramic material.

As ultraviolet light curable resins or electron beam curable resins, compositions comprising a prepolymer, oligomer and/or monomer having, in its molecule, a polymerizable unsaturated bond such as a (meth)acryloyl group or a (meth)acryloyloxy group or an epoxy group. In this connection, the term "(meth)acryloyl" is used to mean "acryloyl" or "methacryloyl" throughout the specification.

Such prepolymer and oligomer include an acrylate such as urethane (meth)acrylate, polyester (meth)acrylate epoxy (meth)acrylate, and an unsaturated polyester. Further, a dipentaerythritol penta (meth)acrylate can be exemplified as the monomer used in this case.

It is important that these materials contain absolutely no light-diffusing particles, unlike in the ordinary light-diffusing plate (such as that cited in U.S. Pat. No. 4,729,067)

For a light-diffusing sheet 8 for an edge-lit flat light source, a sheet of the above described transparent material that has a thickness on the order of 5 to 200 $\mu$m is used.

Alternatively, for a back-lit light source, the light-diffusing sheet 8 must support its own weight and bear external forces, so it should have a thickness on the order of 1 to 10 mm to prevent distortion.

Figure 13:
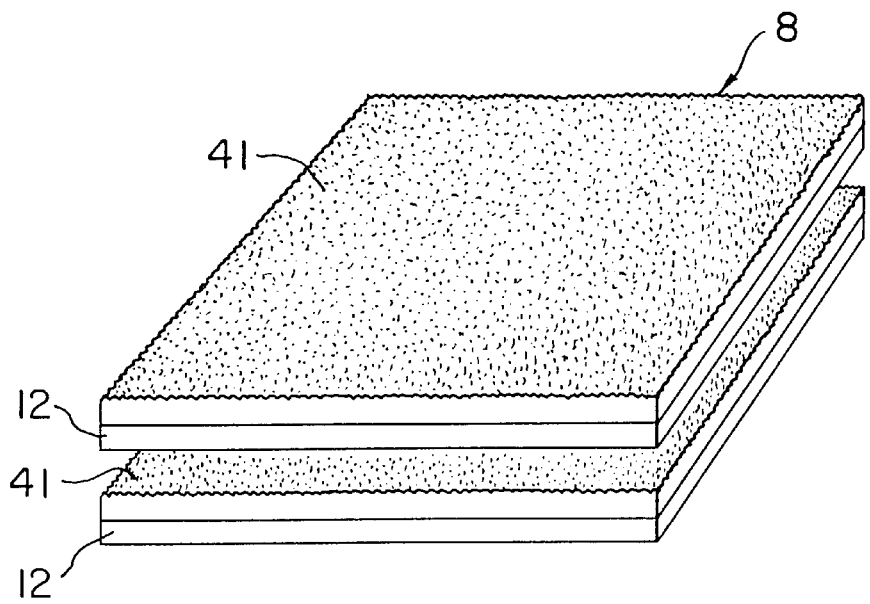
FIG. 13 is a perspective view of an example of the light-diffusing sheet of the present invention, fabricated by the fabrication method shown in FIG. 12.

The light-diffusing sheet 8 could have a single-layer structure as shown in FIG. 1, or a double-layer structure as shown in FIG. 13, or even a multi-layer structure with three or more layers.

The projections 41 on the surface of the light-diffusing sheet 8 are formed as fine irregularities of a height that is at least the wavelength of the light from the light source, but no more than 100 $\mu$m. These irregularities could be formed directly by subjecting the surface of the optically transmissive material to embossing by a thermal press or to sand-blasting, or they could be formed by a method such as casting. Alternatively, a layer of an optically transmissive material having these projections 41 could be formed on the flat surface of the optically transmissive plate. More specifically, a method such as that described in Japanese Patent Laid Open No. 5-169,015 and U.S. Pat. No. 4,576, 850 could be used, in which projections 41 are formed on the surface of an optically transmissive base film 12 by using rolls and the above ultraviolet- or electron-beam-curable (hardenable) plastic.

Figure 3:
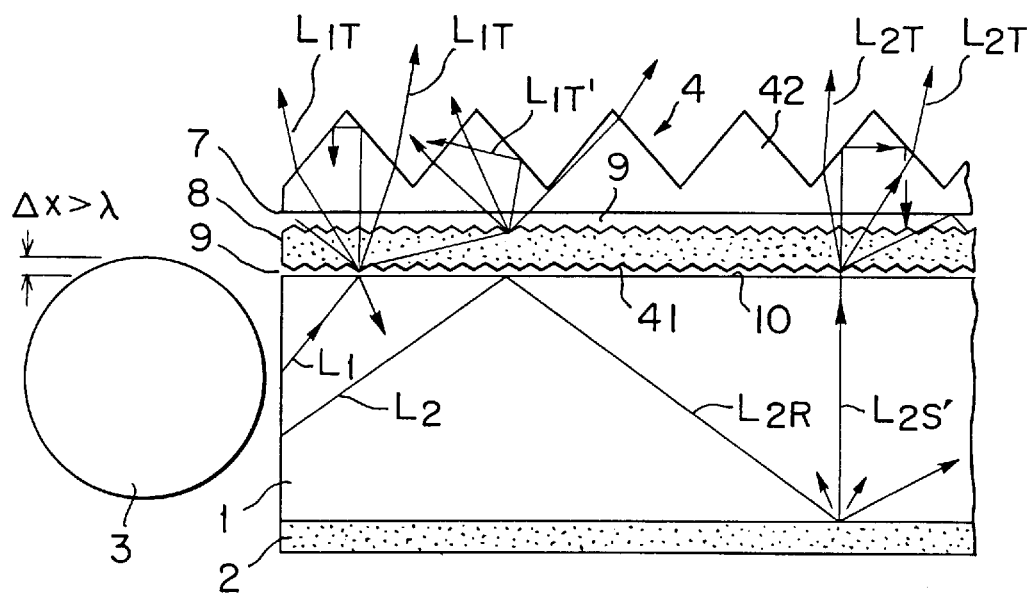
FIG. 3 is a cross-sectional illustrative view through an example of an edge-lit flat light source, showing groups of projections formed on both surfaces of the light-diffusing sheet.

In addition to diffusing the light transmitted thereto isotropically, the projections 41 formed on the light-diffusing sheet 8 are designed to create the gap 9 of at least the wavelength $\lambda$ of the light from the light source (dimension $\Delta x$) between the light-diffusing sheet 8 and a smooth surface 10 that is the outer surface of the optically conductive plate 1 and/or between the light-diffusing sheet 8 and a smooth surface 7 that is the rear surface of the lens sheet 4, as shown in FIG. 3, at least over small areas of the light-diffusing sheet 8. As will be described later, if the dimension $\Delta X$ of each gap is less than that of the wavelength of the light from the light source, it will not be possible for the smooth surface 10 of the optically conductive plate 1 to reflect all the light sufficiently. Conversely, if the height of the irregularities that form the projections 41 exceeds 100 $\mu$m, the irregularities of the projections 41 will become visible to the eye. This is not desirable.

Figure 31:
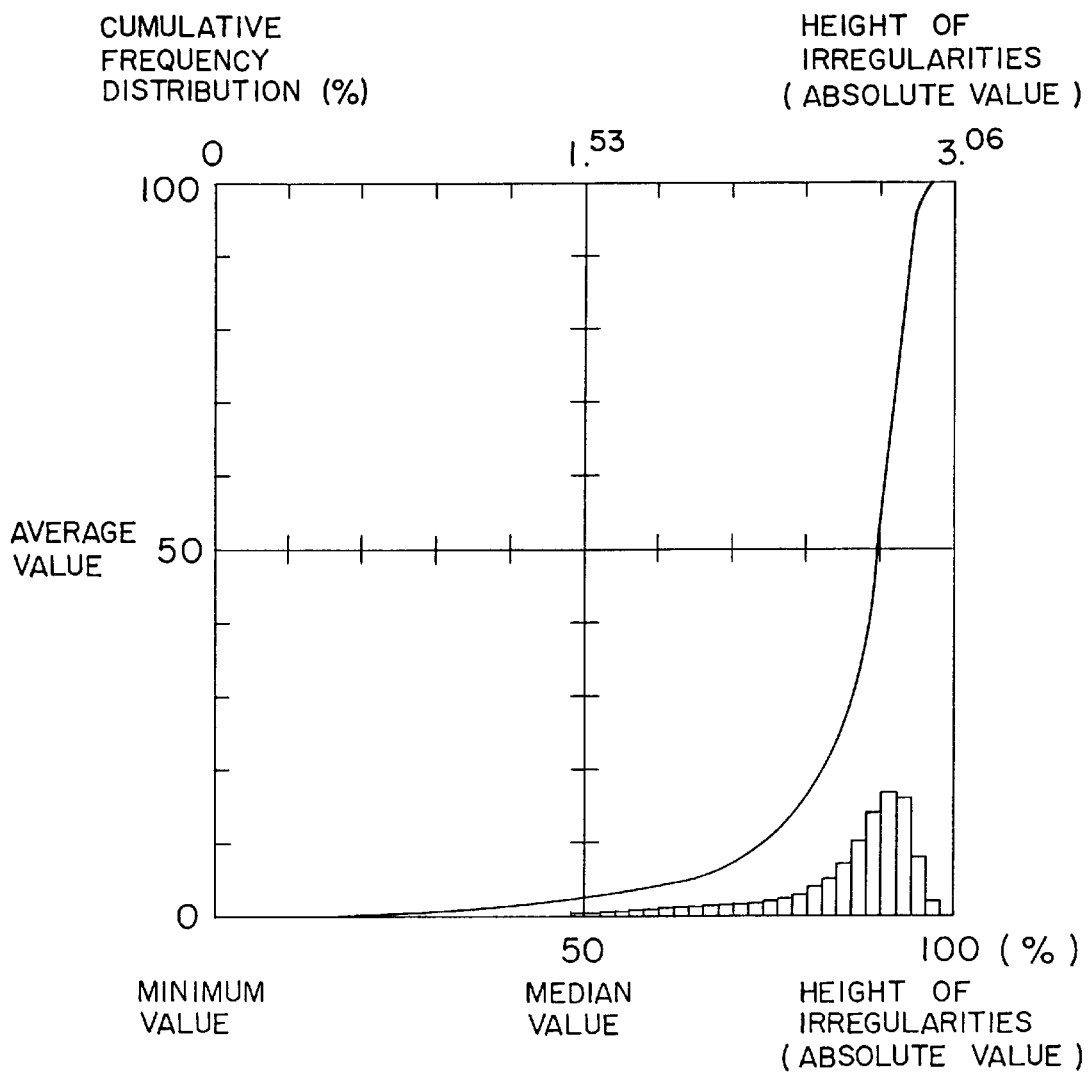
FIG. 31 is a graph showing the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) plotted along the Y-axis, in a case in which the cumulative frequency distribution curve has a downward convexity over the entire region thereof.

If the above design conditions are satisfied, the projections 41 can be of any irregular shape. However, the most preferable form thereof, from the viewpoints of obtaining a uniform angular distribution of luminance within a certain angle of diffusion and a uniform luminance distribution within the surface of the light source, is such that minute irregularities are formed randomly (such as in a sharkskin pattern or a pear skin pattern) over the entire surface of the light-diffusing sheet 8, and these minute irregularities have a surface roughness that is at least the wavelength of the light emitted from the light source but is no more than 100 $\mu$m. When a curve of the cumulative frequency distribution of the heights of these minute irregularities is plotted as shown in FIG. 31, with the percentage of the cumulative frequency distribution of the heights of the minute irregularities along the Y-axis and the heights of these minute irregularities along the X-axis, the cumulative frequency distribution curve should typically have a convex portion oriented towards the lower side of the coordinates and the average value of the height of the minute irregularities should be greater than the median thereof.

With the configuration as described above, the projections 41 act as a light-diffusing layer so that light rays such as L1 and L2 incident on the rear surface of the light-diffusing sheet 8, as shown in FIG. 3, are diffused isotropically thereby. Thus the incident light has a uniform angular distribution and a high-quality, very bright flat light source that does not have an obvious dot pattern is obtained.

Figure 22:
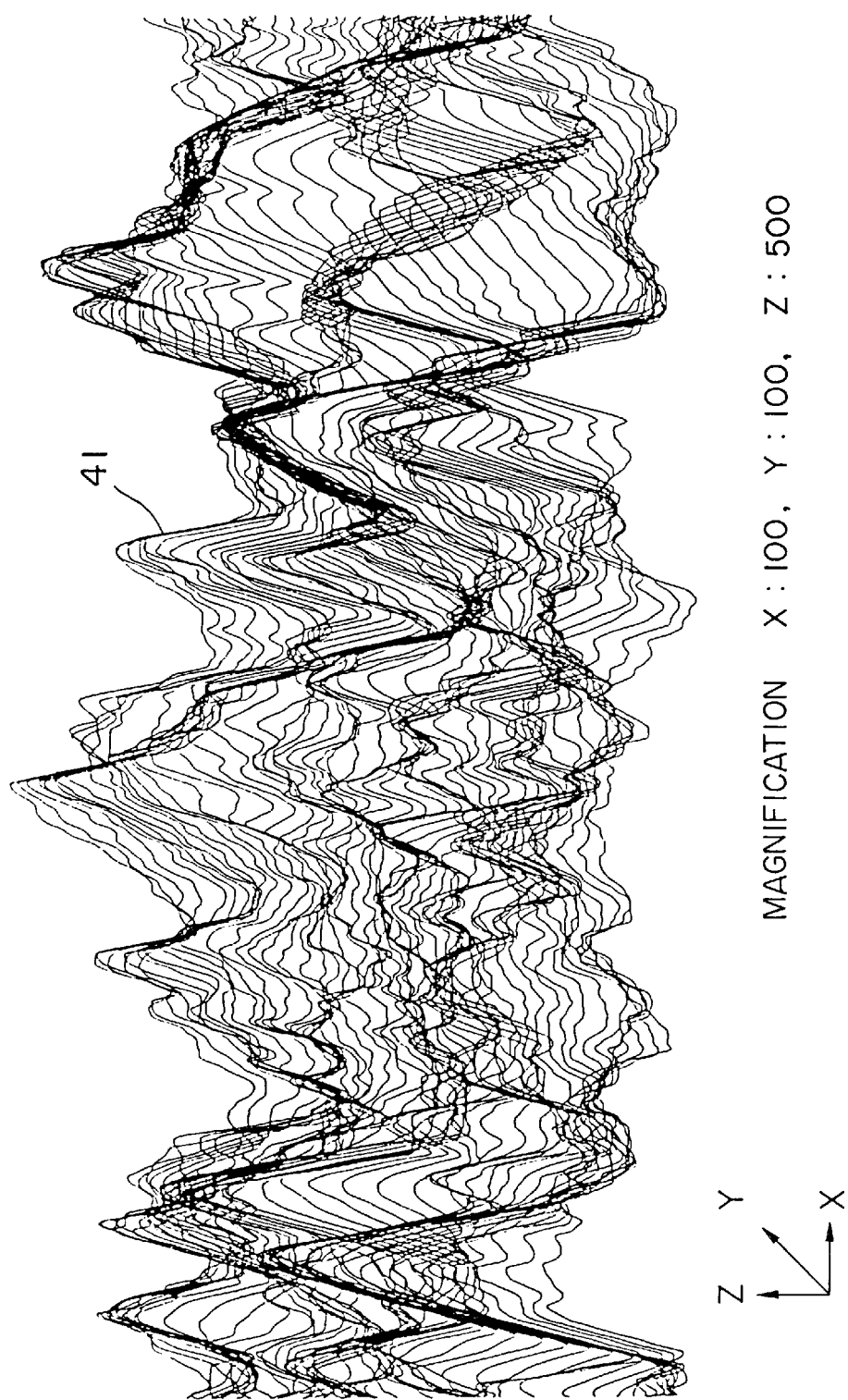
FIG. 22 is a fragmentary expanded three-dimensional visualization of measurements showing the projections of a light-diffusing sheet used in this invention having the cumulative frequency distribution characteristics of FIG. 21.
Figure 24:
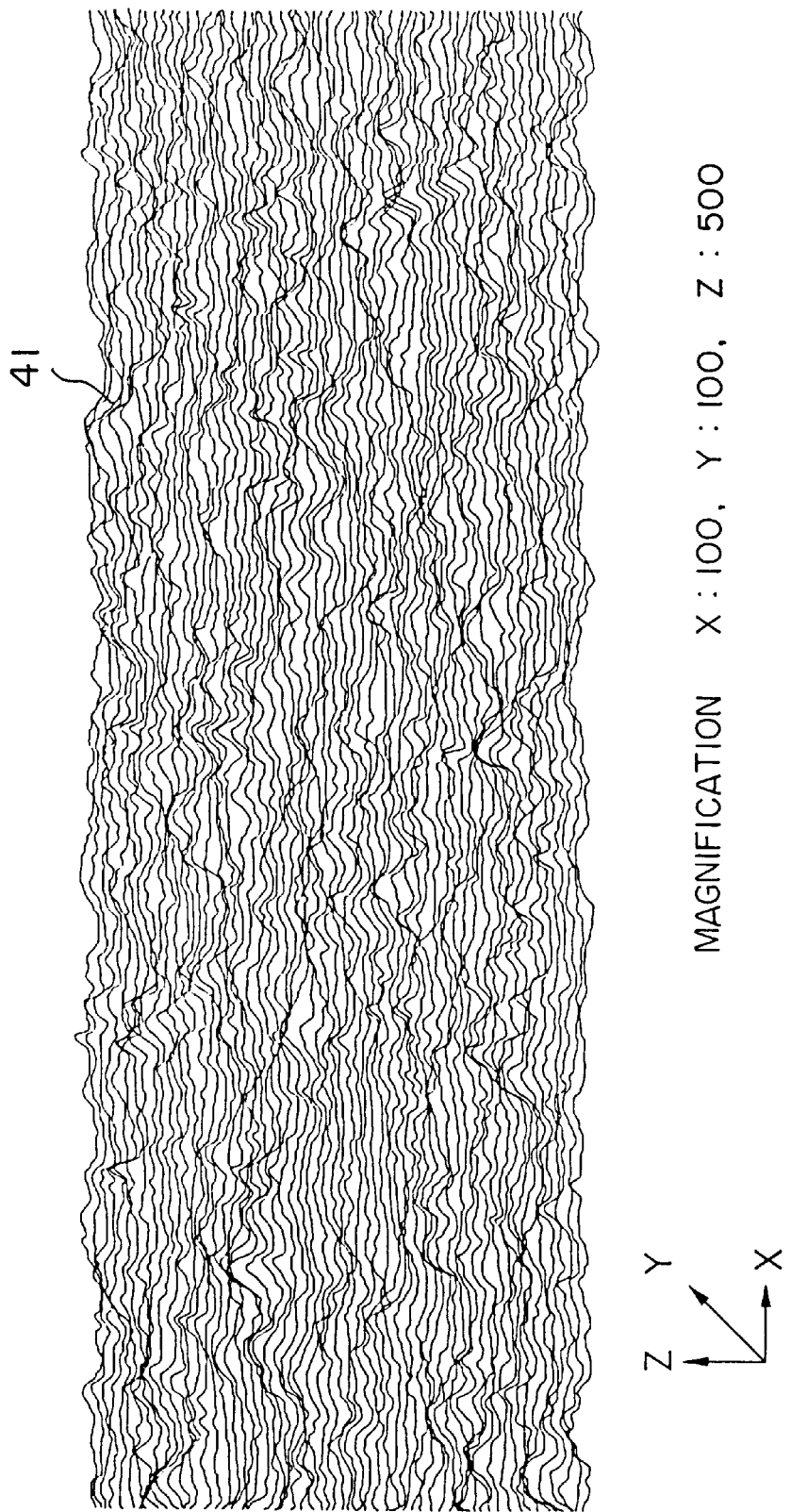
FIG. 24 is a partial expanded three-dimensional visualization of measurements showing the projections of a light-diffusing sheet used in this invention having the cumulative frequency distribution characteristics of FIG. 23.

It is preferable that the shapes of the projections 41 are such that concavities therebetween become narrower towards the bottom, as shown in FIGS. 22 and 24 or more schematically in FIGS. 18 and 19. The cross-sectional shape of the projections 41 are curves such as sine waves or cycloids in which the periodic amplitude thereof varies at random in each cycle, or such as sectional curves that are formed at random by a method such as sand-blasting or milling and which have narrowed bottoms. The depths thereof and the distances between neighboring peaks are at least the wavelength of the light from the light source, but no more than 100 $\mu$m, and minute concavities and convexities are molded therein in such a manner that the above cumulative frequency distribution condition is satisfied. Such a configuration is preferable from the viewpoints of a uniform angular distribution of the transmitted light, the height of the transmissivity, and, as will be described later, the total reflectivity at the boundary between the surface of the optically conductive plate and the light-diffusing sheet.

If this configuration is used with a fabrication method in which the sheet is cast in a metal mold, cured, and then removed, such as that described in Japanese Patent Laid Open No. 5-169,015, a defective product will be produced. In other words, if the central portions of the concavities expand, it will become impossible, or at least very difficult, to remove the casting from the mold.

The light-diffusing sheet 8 could be formed by various different methods, such as a known casting method, a thermal pressing method (as is described in Japanese Patent Laid Open No. 6-157,310); or a method of using a roll-embossing plate to emboss a thermoplastic plastic film that can be cured by ultraviolet light, then illuminating the film with ultraviolet light to harden it (as described in Japanese Patent Laid Open No. 6-156,273). A further method involves applying a layer of a ultraviolet- or electron-beam-curable plastic over a roll mold provided with lens-shaped concavities, to fill these concavities, then covering the roll mold with a transparent film, with this plastic therebetween, and hardening this plastic by either illuminating the rear surface of the film with ultraviolet light or illuminating the transparent film with ultraviolet light after the pattern has been imprinted therein. The cured plastic and the transparent film attached thereto is removed from the roll mold, and thus the lens shapes of the roll mold are imprinted in the cured plastic layer (as described in Japanese Patent Laid Open No. 5-169,015 and U.S. Pat. No. 4,576,850).

Figure 4:
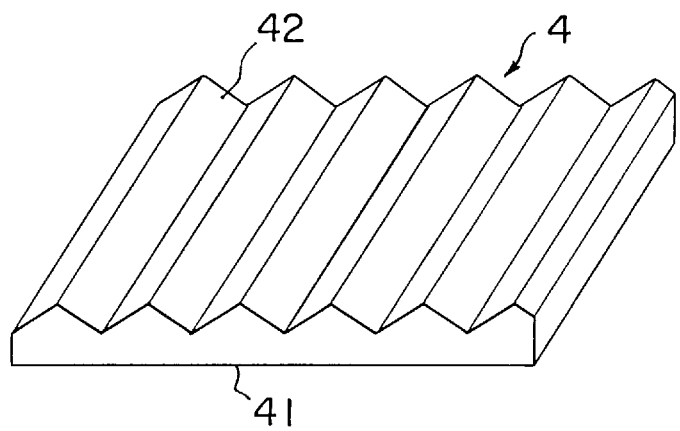
FIG. 4 is a perspective view of an example of a lens sheet used by the present invention.
Figure 5:
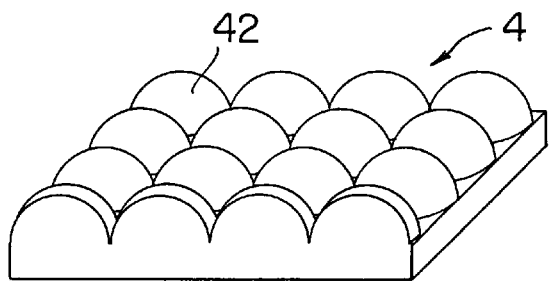
FIG. 5 is a perspective view of another example of a lens sheet used by the present invention.

The lens sheet 4 used in the light source of the present invention could be a one-dimensional array of lenses (broadly speaking, a lenticular sheet) formed of a large number of individual prismatic lenses 42 arranged parallel to and in contact with one another in the ridged direction thereof, as shown in FIG. 4. Alternatively, it could be two-dimensional array of lenses formed of a large number of individual protuberant lenses 42 of a hemispherical or similar shape, arranged in two directions to form a fly's-eye lens sheet, as shown in FIG. 5.

In this case, any smooth, continuous curve such as a circular, elliptical, cardioid, Rankine's oval, cycloid, or involute curve, or a polygonal shape such as a triangular, rectangular, or hexagonal shape could be used as the sectional shape of each individual lens 42.

Figure 6:
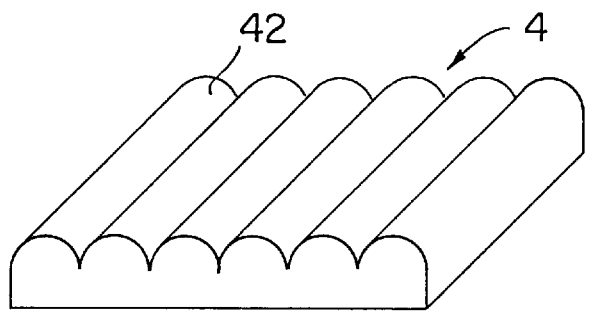
FIG. 6 is a perspective view of a further example of a lens sheet used by the present invention.
Figure 7:
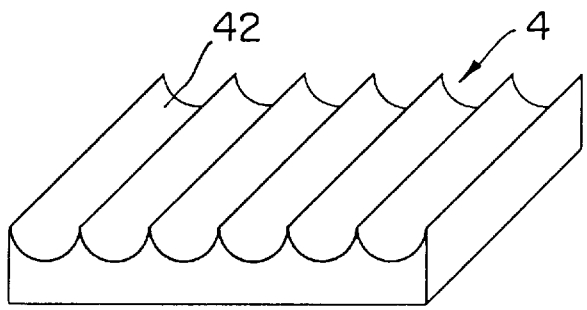
FIG. 7 is a perspective view of yet another example of a lens sheet used by the present invention.

These individual lenses could be convex as shown in FIG. 6 or concave as shown in FIG. 7. Of these shapes, a preferable one is a circular or elliptical prism, from the viewpoints of ease of design and fabrication, focusing, and light-dispersing capability [i.e., the smallness of the half-angle and sidelobe light (luminance peaks that occur in oblique directions), the isotropicality of the half-angle luminance, and the luminance in the normal direction]. An elliptical prism with the major axis thereof at the normal to the flat light source gives a particularly preferable luminance.

Figure 8:
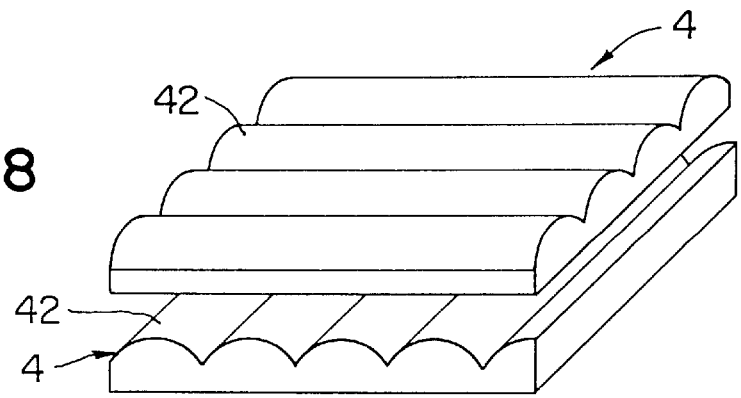
FIG. 8 is a perspective view of an example of two superimposed lens sheets used by the present invention.

The lens sheet could have a single-sheet configuration, or two lens sheets using cylindrical lenses in two directions (vertically and horizontally), to enable control over the light-scattering angle, could be superimposed with the ridges thereof crossing orthogonally, as shown in FIG. 8. In such a case, it would be best to have both the lens surfaces facing in the same direction to increase the transmittance of the light, as shown in FIG. 8, but it is of course possible to have the lens surfaces of the two sheets facing one another (the lens surfaces sandwiched between the two sheets).

The lens sheet 4 is fabricated from an optically transmissive material. In this case, the same material as that of the light-diffusing sheet 8 could be used as this optically transmissive material. A thermoplastic plastic such as an acrylic or a polycarbonate, or a (meth)acrylate plastic that is cured by ultraviolet light or electron beam is ordinarily used therefor.

If such an optically transmissive material is used for the lens sheet, it would usually have a thickness of approximately 20 to 1000 $\mu$m.

The transmissivity required of the optically transmissive material should be high and this material should most preferably be colorless and transparent. However, when it is used in the lens sheet, it could be colored and transparent, matted and transparent, or matted and translucent, depending on the application.

In this case, "matted and transparent" means that the material has the properties of causing light to be diffused and transmitted substantially isotropically in all directions within a semi-3D angular range. This term is used as a synonym for optical anisotropic diffusion. In other words, when the angle to the normal of the surface of the transparent material is assumed to be $\theta$ and a parallel light beam is incident from the rear surface thereof (at an angle of incidence i=0 degrees), the angular distribution $I°(\theta)$ of the strength of transmitted light of a matted and transparent material has a cosine distribution given by the following equation, or an approximation thereto:

$$I°(\theta)=I°_{mp} \cos \theta\ -90° \leq \theta \leq 90°$$

where $\theta$ is the angle to the normal N and $I°_{mp}$ is the strength of transmitted light in the normal direction.

Either a flat plate of a transparent material or a flat plate of such a material having a rectangular cavity is used as the optically conductive plate (the optically conductive member) of the apparatus of this invention. However, it is preferable that a flat plate of a transparent material is used to ensure that total reflection within the optically conductive member is utilized to distribute the light from the light source throughout the entire optically conductive member, and also to ensure sufficient strength to support the light-diffusing sheet 8.

For these reasons, an optically conductive plate 1 (see FIG. 1) formed as a flat plate of a transparent material is used in the apparatus of the present invention. The surface 10 opposite to a light-scattering reflective layer of the optically conductive plate 1 is a flat surface, with a surface roughness that is finished to be at the maximum the wavelength of the light of the light source. "Surface roughness" here must be evaluated not by the averaged value of the projections (irregularities), but by the average of the differences between the top and bottom portions of the projections. It is measured as the ten-point average roughness Rz as defined in JIS-B-0601 or the ISO regulations, for example. Ordinarily, since the light from the light source is visible light of wavelengths between 0.4 and 0.8 $\mu$m, this surface roughness is no more than 0.4 $\mu$m. The distance between neighboring projections is similarly evaluated as an average value such as Sm, as defined by the ISO regulations.

A known method can be used to attain this degree of roughness, such as thermal pressing of a mirrored plate, injection molding using a mirrored surface as a mold, casting, or precision grinding used for optical lenses.

The material of the optically conductive plate 1 is selected from amongst the same optically transmissive materials as those quoted above for the lens sheet. Ordinarily, a plate of a substance such as acrylic plastic or polycarbonate plastic of a thickness of approximately 1 to 10 mm is used therefor.

A linear light source such as a fluorescent light is preferable as the light source 3 used in the apparatus of the present invention, from the viewpoint of obtaining a completely uniform luminance, but a point light source such as an incandescent bulb may also be used. As an alternative to providing the light source 3 at a distance from the side edge portion of the optically conductive plate 1 as shown in FIG. 1, a through hole could be provided in the optically conductive plate 1 or part of the side edge portion thereof could be cut away, so that the light source can be embedded either partially or totally within the optically conductive plate 1.

To increase the luminance and make the distribution of luminance within the surface more uniform, another light source 3' (not shown in the figure) could be provided at another side edge portion on the opposite side of the optically conductive plate 1. The number of light sources could be one as shown in FIG. 1, or more than one as shown in FIG. 2. Edge-lighting light sources similar to that shown in FIG. 1 may, of course, be arranged along two or more side edge surfaces.

A known type of mirror is used as the reflective mirror 5, such as a member in the shape of a partial cylinder with a parabolic, hyperbolic, or elliptical surface, with a thin metal film formed on the internal surface thereof by a method such as deposition or plating.

The light-diffusing sheet 8 is superimposed on the smooth surface 10 of the optically conductive plate 1, then the lens sheet 4 is superimposed over the light-diffusing sheet 8.

During this process, a gap 9 of at least the wavelength λ of the light from the light source may be formed at least partially between the smooth surface 7 of the lens sheet 4 and the light-diffusing sheet 8 and/or between the smooth surface 10 of the optically conductive plate 1 and the projections 41 of the light-diffusing sheet 8, by placing the smooth surface 7 of the lens sheet 4 on the outer side of the lens surface of the lens sheet 4 (the surface thereof opposite to the surface 10), facing the side of the light-diffusing sheet 8 with the projections 41, as shown in FIG. 3.

The area ratio K of the gap 9 is given by:

K=(area of portions having a gap of at least the wavelength λ)/(total surface area of the optically conductive plate)×100 (%)

The value of K is determined by factors such as the uniformity of distribution of the luminance required within the surface, the utilization ratio of optical energy, and the dimensions of the optically conductive plate. Normally a ratio K of at least 80%, more preferably at least 90%, is necessary.

Figure 16:
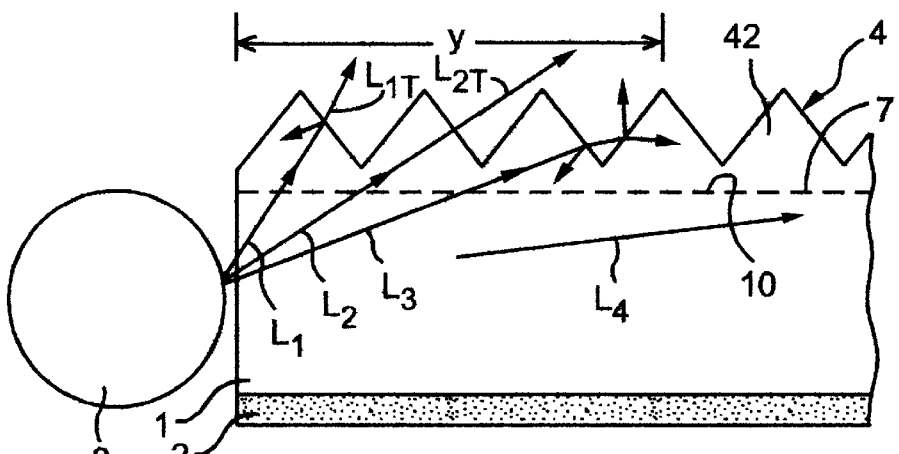
FIG. 16 is a sectional view of the configuration of FIG. 15.

The results of experiments have made it clear that, when the surface roughness of the surface 10 of the optically conductive plate 1 and the surface roughness of the surface 7 of the lens sheet 4 are both less than the wavelength of the light and the surface 10 is in intimate contact with the surface 7 as shown in FIG. 16, the largest portion of the light that is input from the light source 3 is not totally reflected within the portions of the optically conductive plate that are further than a distance y from the side edge portion at which the light source is placed. Instead it is radiated towards the other side end portion and thus the luminance in the portions further than the distance y is dramatically decreased and these portions become dark.

Figure 15:
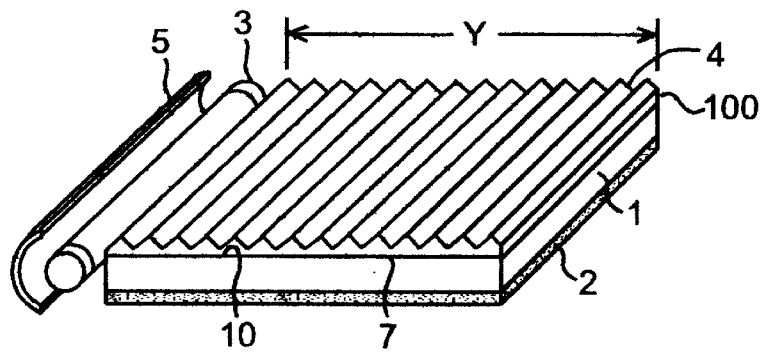
FIG. 15 is a perspective view of the edge-lit flat light source of the prior art, showing a lens sheet having a flat rear surface.

Measurements have determined that the ratio of the length y of the bright portion and the total length Y in the light-propagation direction of the optically conductive plate 1 (see FIG. 15), in other words, the value of (y/Y)×100%, is of the order of 10% to 20%.

In this case, to ensure that the amount of optical energy incident from the light source 3 onto the surface 10 of the optically conductive plate is distributed evenly, it is inevitable that between 10% and 20% of the light incident on the surface 10 has to pass therethrough, but the remaining between 80% and 90% thereof must be totally reflected.

In general, the above conclusion is reached by assuming a value of K that is at least between 80% and 90%, from approximation of the following:

(amount of totally reflected light)/(total amount of incident light)×100 (%)≈(area of portions having a gap of at least the wavelength λ)/(total surface area of the optically conductive plate)×100 (%)=K The light reflecting layer 2 used in the apparatus of this invention has the capability of scattering and reflecting light and can be constructed in one of the following manners:

1. A layer containing uniformly distributed powdered pigment that is highly concealing and very white, such as titanium dioxide or aluminum, is applied over one surface of the optically conductive plate.

2. minute frosted or matted irregularities are formed by a method such as sand blasting or embossing, then a thin layer of a metal such as aluminum, chrome, or silver is formed by a method such as deposition or plating on this surface of the optically conductive plate that is patterned with irregularities.

3. A thin metal layer is formed by a method such as deposition on a white, non-concealing layer formed by a method such as painting on a matte surface.

4. A white dot-patterned layer is formed, and the amount of light from the light source 3 is adjusted by increasing the area ratio of the white portions thereof further from the light source.

The above description has mainly concerned an edge-lit flat light source, but it should be obvious to those skilled in the art that the combination of a light-diffusing sheet and a lens sheet of this invention can equally well be applied to a back-lit light source as shown in FIG. 2. It should also be obvious that a stack of two or more of the light-diffusing sheets 8 can be used, if necessary. Moreover, if it is permitted to have a comparatively wide angle of diffusion for the light (half-angle, etc.) a flat light source can be configured by a single light-diffusing sheet 8 in accordance with the present invention, or a stack of a plurality of these sheets.

Figure 14:
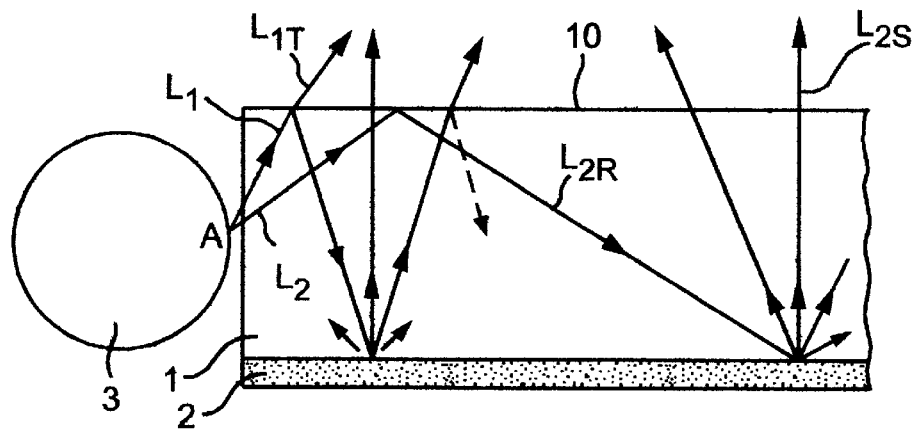
FIG. 14 is a cross-sectional view through an edge-lit flat light source of the prior art, showing the lack of a lens sheet.

The operational mechanism of an edge-lit light source is shown in FIG. 14. Of light rays that are incident from the light source 3 onto the optically conductive plate 1 and are directly incident on the smooth surface 10 of the optically conductive plate, the angle of incidence (angle subtended to the normal of the surface 10) of a light ray L1 incident in the vicinity of the light source is less than the critical angle, and thus a certain proportion of the incident light is emitted to the exterior as transmissive light L1T. This forms emitted light in the vicinity of the light source. On the other hand, the angle of incidence of a light ray L2 that is directly incident comparatively far from the light source 3 is greater than the critical angle, and thus it is sent further as a totally reflected light ray L2R, without being emitted to the exterior. It is turned into scattered and reflected light L2S by the light reflecting layer 2 on the rear surface of the optically conductive plate and therefore proceeds in all directions. A certain proportion of this light is incident on the surface 10 at less than the critical angle and a further certain proportion thereof is emitted. This is the principle behind the formation of emitted light at portions of the optically conductive plate away from the light source 3.

A state is shown in FIG. 16 in which the non-lens surface of the lens sheet 4, which forms the smooth surface 7, is superimposed on the smooth surface 10 of the optically conductive plate 1 in contact therewith. Ordinarily, the refractive indices of the optically transmissive materials that are used therefor are both in the region of 1.5, so that the mutual difference thereof is not great. Thus the assembly of the lens sheet 4 and optically conductive plate 1 shown in FIG. 16 can be assumed to be substantially integral from the optical viewpoint. Under that assumption, the front surfaces of the individual lenses 42 of the lens sheet 4 are inclined with respect to the smooth surface 10, so that most of the light rays incident on the optically conductive plate 1 in the vicinity of the light source, such as light rays L1, L2, and L3, are incident at less than the critical angle. Therefore, a certain proportion thereof is emitted directly, and most of the reflected light also returns in the direction of the light source and is not propagated further. Of course, there are some light rays that are directly incident to the lens surface far from the light source, such as the light ray L4 in FIG. 16, but the quantity thereof is smaller than that in FIG. 14.

Therefore, the majority of light emitted from the flat light source is concentrated in the vicinity of the light source, that is, at positions between 10% and 20% of the total area of the optically conductive plate 1, as described above.

With the configuration of the present invention, on the other hand, projections 41 are formed in the surface of the light-diffusing sheet 8 as shown in FIG. 1, and these projections 41 create gaps 9 between the smooth surface 10 of the optically conductive plate 1 and the lens sheet 4, at least locally.

Since these gaps are in the vicinity of the smooth surface 10 acting as a boundary between the optically conductive plate 1 of refractive index 1.5 and a layer of air (or vacuum) of refractive index 1.0, the same total reflection of light as that of FIG. 14 occurs. Thus emitted light is obtained from light rays L1T that are incident to the surface 10 at less than the critical angle and are passed therethrough, in a region close to the light source 3. Alternatively, emitted light is obtained from components L2T that are part of the light that is totally reflected at the boundary surface of the gap 9 and then is reflected and scattered by the light reflecting layer 2 on the rear surface of the optically conductive plate, but at less than the critical angle, in a region far from the light source 3.

Of course, those parts of the light L2T that are incident in regions where the projections 41 and the surface are in contact are transmitted unchanged as emitted light, without being totally reflected. If the area ratio K is at least between 80% and 90%, a substantially uniform luminance distribution is obtained, as has been described before.

Total reflection can be assured at the surface 10 by making the heights of the projections 41 (that is, of the gaps 9) at least the wavelength $\lambda$ of the light from the light source.

Figure 9:
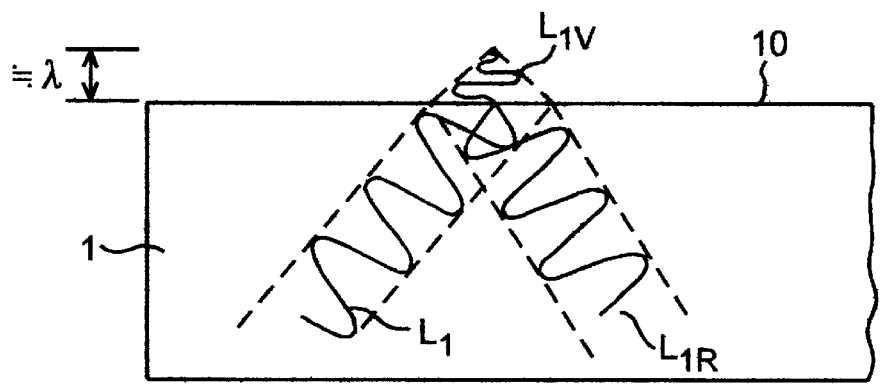
FIG. 9 is a sectional view showing the paths of light rays travelling from the interior of the optically conductive plate to the outside thereof.

The reason for this is shown in FIG. 9. When the light ray L1 that is incident on the smooth surface 10 of the optically conductive plate 1 from within the optically conductive plate 1 is totally reflected thereby to become reflected light L1R, the electromagnetic field of the light does not, strictly speaking, lie within the air (or vacuum) of the gap 9, but the tunnel effect ensures that part of it passes through the surface 10 and exists as an electromagnetic field L1V. However, this electromagnetic field L1V attenuates exponentially until it has an amplitude of zero within a distance of the order of the wavelength of the light, and is thus drawn back toward the optically conductive plate 1.

Therefore, if the gap 9 is made to be a distance that is sufficiently larger than the wavelength of the light, none of the light L1 enters the lens sheet 4 from the gap 9.

Figure 10:
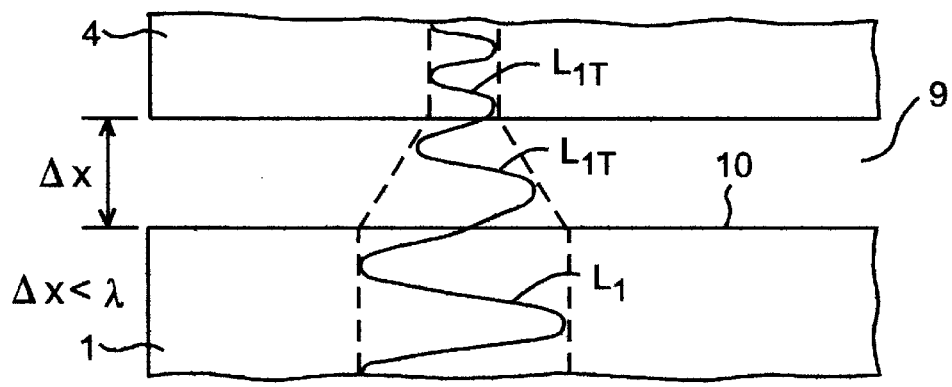
FIG. 10 is a sectional view showing light rays that have been emitted by the tunnel effect from the optically conductive plate as they proceed into the lens sheet.

However, if the lens sheet 4 having substantially the same refractive index as the optically conductive plate 1 is placed closer to the surface 10 of the optically conductive plate, at a distance $\Delta X$ that is less than the wavelength $\lambda$ of the light ($\Delta X<\lambda$), this electromagnetic field L1V is not completely attenuated and reaches the lens sheet 4, whereupon transmitted light L1T is once again generated, as shown in FIG. 10.

Figure 11:
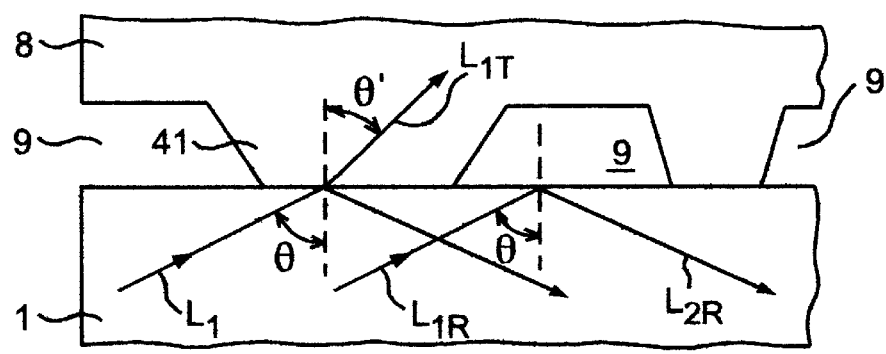
FIG. 11 is a sectional view showing how some of the light rays proceeding towards the exterior of the optically conductive plate are totally reflected while others are transmitted, when the light-diffusing sheet of the present invention is used.

Since the projections 41 are formed on the surface of the light-diffusing sheet 8 in the configuration of the present invention, it is possible to form both a region having a gap 9 between the optically conductive plate 1 and the light-diffusing sheet 8 and/or between the light-diffusing sheet 8 and the lens sheet 4 and a region that is completely integrated optically between these surfaces, with no gap 9 (or with a gap of less than the wavelength of the light), as shown in FIG. 11.

Incident light is totally reflected within such portions that have the gap 9, but is passed through such portions that do not have the gap 9. The ratio of the area of those portions having the gap 9 with respect to the total area of the optically conductive plate 1 determines the ratio of light that is totally reflected by the surface 10, as has been described hereinbefore.

This configuration ensures that the apparatus of the present invention can utilize the optical energy efficiently, to enable a uniform, very bright flat light source.

Specific embodiments 1 to 6 of the light-diffusing sheet 8 used in the present invention will now be described, concerning the characteristics of projections 41 of various forms obtained by varying the conditions of the roll molds thereof. The description below also concerns embodiments of a method of fabricating the lens sheet 4, a flat light source that uses the lens sheet 4, and a transmission type of display device using this flat light source, together with comparative examples and with reference to the accompanying drawings.

Fabrication Process for Light-Diffusing Sheet 8

A previous paragraph discussed the necessity of separating and removing the light-diffusing sheet 8 having projections 41 from the roll mold. However, it should be obvious that the shape of a mold M must be concave with no interior expansion or undercutting, as shown in FIGS. 18 and 19, in order to ensure that the cured plastic layer can be removed from the mold while retaining the designed shape thereof. A shape that has undercuts 50, as shown in FIG. 20, would be impossible to remove from the mold.

During the fabrication of the light-diffusing sheet 8, in addition to a lack of interior expansion or undercutting in the concavities of this mold, the cumulative frequency distribution of the surface roughness of the mold is also important as a condition for satisfying both the light-diffusing characteristics and mold-release capability of the light-diffusing sheet 8. In other words, measurements of surface roughness by an electrical probe or optical method could be performed to obtain statistics on the depth of concavities in the surface of the mold (or the height of projections in the imprinted plastic, since the relationship between concavities and convexities is exactly opposite between the surfaces of the mold and the imprinted plastic). The results can be plotted as curves of a cumulative frequency distribution function f(R) as expressed by Equation 1 below, with surface roughness (that is, the percentage of cumulative frequency distribution of depths R of the concavities in the mold) along the X-axis and surface roughness (that is, the depths R of the concavities in the mold) along the Y-axis, as shown in FIG. 17. A good mold separation capability is obtained when the curve rises late and has a downward convexity, as shown by the curve fB(R) in FIG. 17, even though the maximum value Rmax of R would be the same. The present invention was designed in such a manner that a curve of this type is obtained.

$$f(R) = \int_{X=0}^{R} P(x)dx \tag{1}$$

where P(x) is the probability density function of the surface roughness R.

An exaggerated schematic view through the section of an example of a fabrication mold that has a function that forms a downward convexity curve with a slowly rising slope and a long base, as shown by the curve fB(R), is shown in FIG. 19. Projections 41 imprinted by a mold having these characteristics have the same cumulative frequency distribution curve of height as fB(R).

On the other hand, if this curve rises steeply and has an upward convexity, as exhibited by the curve fA(R) in FIG. 17, the characteristics of the resultant mold would not be good.

A fabrication mold having characteristics expressed by a curve like fA(R) has a shape such as that shown in FIG. 18.

A previous paragraph has stated that, if the sectional area of the concavities in the mold is of an undercut shape that increases towards the bottoms thereof, as shown in FIG. 20, the projections 41 cannot be separated from the mold and thus this mold is unsuitable for attaining the objective of this invention.

It has also been determined that the provision of a matte-plated surface formed of aggregations of minute spherical particles of a metal such as chrome forms a sectional area such as that in FIG. 20, and thus makes separation from the mold difficult.

As previously described, a good mold separation is obtained if the curve of cumulative frequency distribution of heights of the projections 41 is convex downward over the entire region of cumulative frequencies 0% to 100%, as shown by the fB(R) curve in FIG. 17. However, experiments have further proved that a sufficiently good separation can be achieved when the cured plastic layer is removed from the concavities in the mold, even if part of the cumulative frequency distribution curve is convex upwards. This result occurs if the height at the point at which the cumulative frequency distribution of the cumulative frequency distribution curve is 50% (that is, the point corresponding to the average value) is to the right of the median value, that is, if:

Average value $\geq$ median value.

The heights of the projections 41, that is, the surface roughness of the light-diffusing sheet 8, were measured and the data obtained thereby was analyzed, using a SURF-CORDER SE-30K manufactured by Kabushiki Kaisha Kosaka Kenkyusho, Japan, under conditions of a traverse speed of 0.2 mm/s and a measurement length of 1 mm.

EXAMPLE 1

The light-diffusing sheet 8 shown in FIG. 13 was fabricated by the process described below, using the apparatus shown in FIG. 12.

1. A stock roll 11 of base film 12, which is a bidirectionally oriented 50-μm thick, colorless, transparent strip of polyethylene terephthalate, was prepared.

2. A roll mold 14 was prepared, this roll mold 14 being provided with concavities 15 formed at random in the cylindrical metal surface thereof by #80 sandblasting in such a manner to ensure a ten-point average roughness Rz of 38 μm, as defined in JIS-B-0601. While this roll mold 14 was rotated, an ultraviolet-curable resin 16 was supplied to the surface thereof from a T-die type of nozzle 21, to cover the concavities in the roll mold 14 sufficiently.

3. The base film 12 was pulled from the stock roll 11 at an extraction speed synchronized with the peripheral speed of the roll mold 14 and was pressed by a pressure roll 13 onto the roll mold 14 to layer it tightly over the resin 16. In this state, the assembled stack was irradiated with ultraviolet light from the rear surface side of the base film 12 by mercury lamps 23, so that the resin was cured as indicated at 17 by cross-linking within the concavities of the surface of the roll mold 14 and, at the same time, it was attached to the base film 12.

4. A separating roll 18 was then used to separate the travelling base film 12 together with the cured resin that has been formed into the shapes of the projections 41 and is attached thereto, to obtain the light-diffusing sheet 8. The light-diffusing sheet 8 was rolled up as is, and was subsequently cut to the desired dimensions according to usage.

Note that the main component of the ultraviolet-curable resin used in the above process was a multifunctional polyester acrylate oligomer, and a photoreactive starter was added thereto.

The characteristics of the thus obtained projections 41 were as follows:

Total applied thickness: 40 μm

Surface roughness Rz: 38.4 μm (ten-point average roughness, JIS-B-0601)

Haze: 88.8 (JIS-K-7105)

Surface area/measured area: 1.230832

Surface glossiness: 11.3 (JIS-Z-8741)

The cumulative frequency distribution curve for Example 1 is shown in FIG. 21. It is clear from this graph that the relationship [average value $\geq$ median value] is satisfied for the height of the irregularities in this case, even though part of the distribution curve is convex upward. As can be seen from the shapes of the imprinted projections 41 shown in FIG. 22, the capability of the cured resin layer to be separated from the concavities in the mold was extremely good, and the light-diffusing capability thereof was also good.

EXAMPLE 2

A light-diffusing sheet 8 was fabricated under the same conditions as those of Example 1, with the fabrication conditions of the roll mold alone being changed.

The roll mold used for Example 2 had a mold surface that was finished by sandblasting with spherical #200 sand. The characteristics of the thus obtained projections 41 were as follows:

Total applied thickness: 40 μm

Surface roughness Rz: 5.62 μm (ten-point average roughness, JIS-B-0601)

Haze: 78.1 (JIS-K-7105)

Surface area/measured area: 1.019303

Surface glossiness: 11.2 (JIS-Z-8741)

Figure 23:
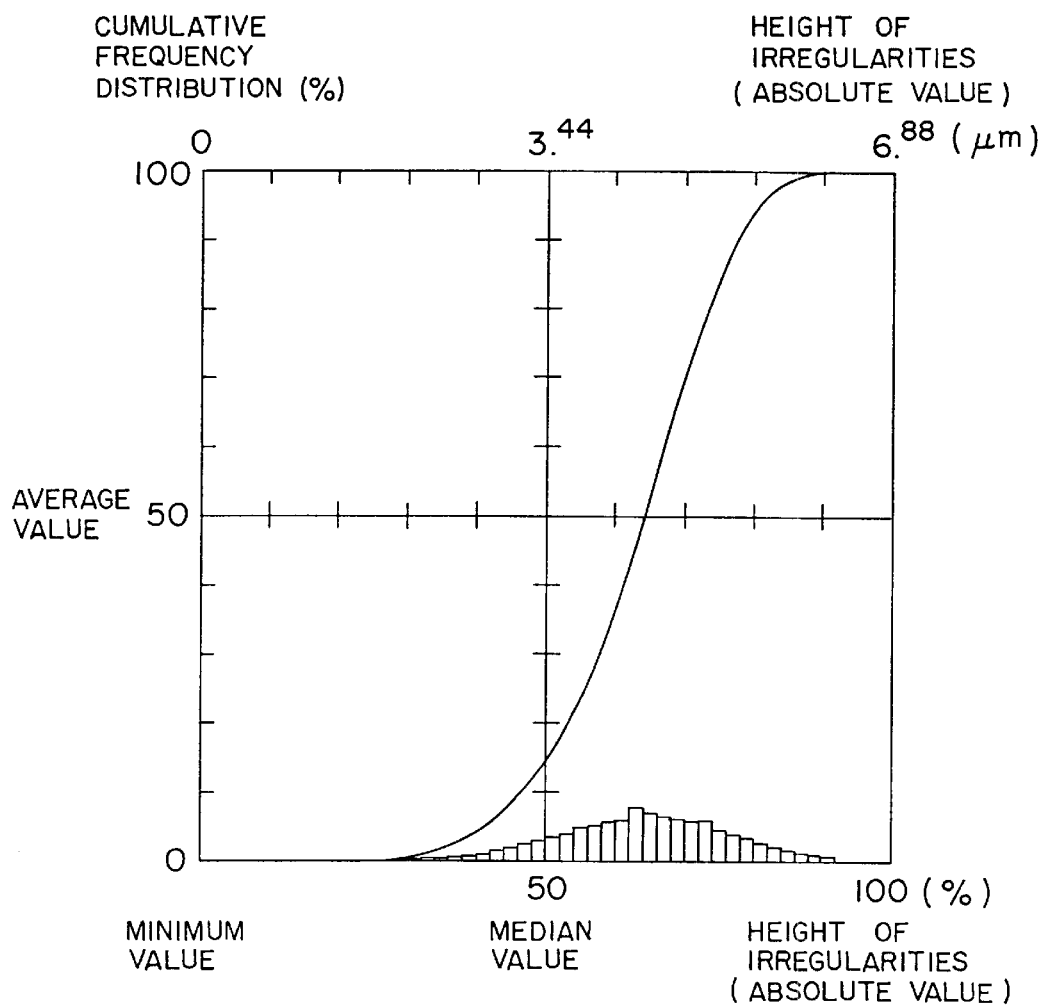
FIG. 23 shows a graph relating to the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) plotted along the Y-axis, in a case in which the cumulative frequency distribution curve has a downward convexity and a relationship (average value ≧ median value) is satisfied.

The cumulative frequency distribution curve for Example 2 is shown in FIG. 23. It is clear from this graph that the relationship [average value $\geq$ median value] is satisfied for the height of the irregularities in this case, even though part of the distribution curve is convex upward. As can be seen from the shapes of the imprinted projections 41 shown in FIG. 24, the capability of the cured resin layer to be separated from the concavities in the mold was extremely good, and the light-diffusing capability thereof was also good.

EXAMPLE 3

A light-diffusing sheet 8 was fabricated under the same conditions as those of Example 1, with the fabrication conditions of the roll mold alone being changed.

The roll mold used for Example 3 had a mold surface that was etched with an agent such as a solution of iron chloride then finished by sandblasting with spherical #200 sand. The surface was then plated with bright chrome. The characteristics of the thus obtained projections 41 were as follows:

Total applied thickness: 40 μm

Surface roughness Rz: 16.1 μm (ten-point average roughness, JIS-B-0601)

Haze: 89.5 (JIS-K-7105)

Surface area/measured area: 1.104595

Surface glossiness: 12.5 (JIS-Z-8741)

Figure 25:
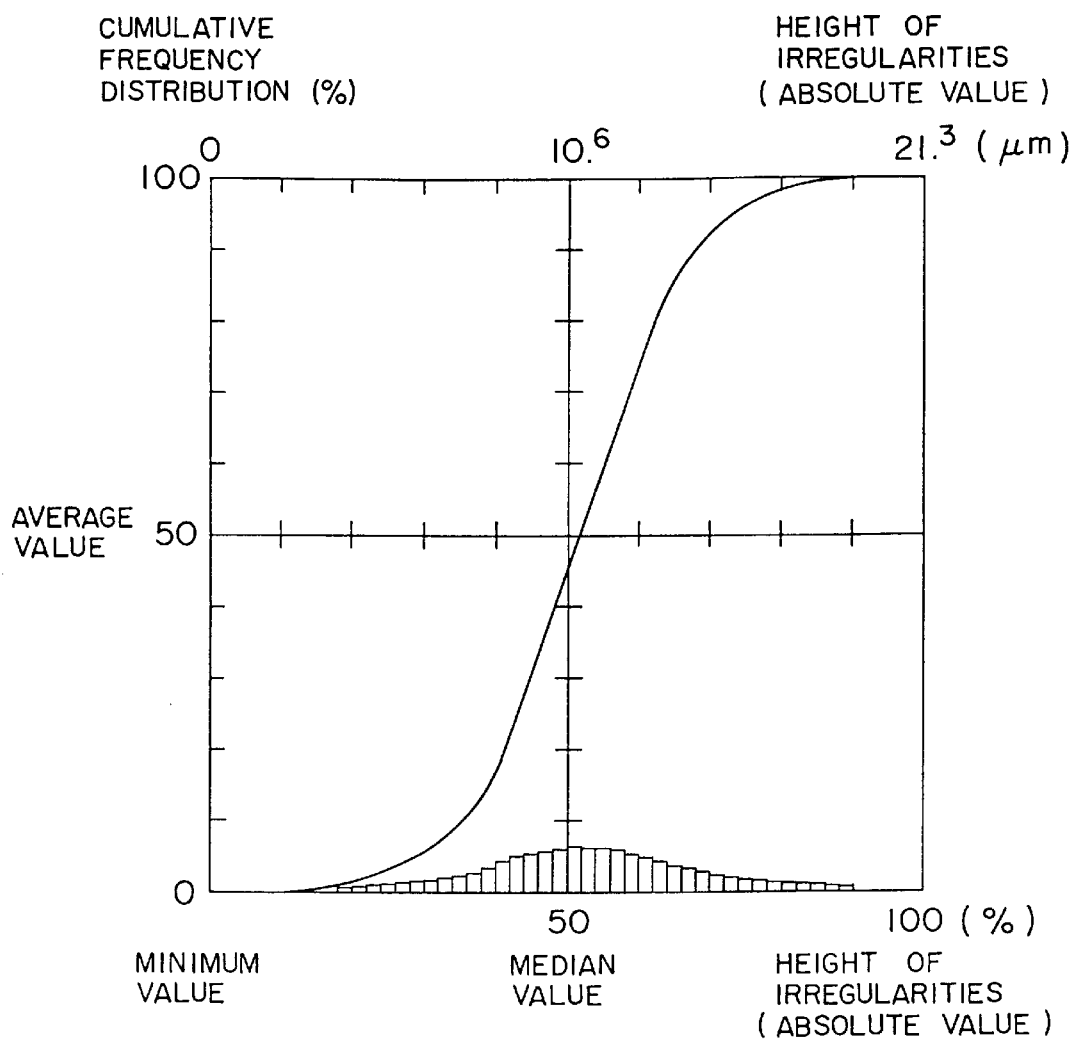
FIG. 25 is a graph showing the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) plotted along the Y-axis, in a case in which the average value of R has a maximum at 52% and the cumulative frequency distribution curve has a downwardly convex portion and an upwardly convex portion.

The cumulative frequency distribution curve for Example 3 is shown in FIG. 25. It is clear from this graph that the average value has a maximum at 52% and the cumulative frequency distribution curve comprises a downwardly-convex portion and an upwardly-convex portion. In this case, a small amount of resistance to separation was encountered during separation from the mold. Therefore, it was determined that these values are close to the critical conditions for mold separation.

Figure 26:
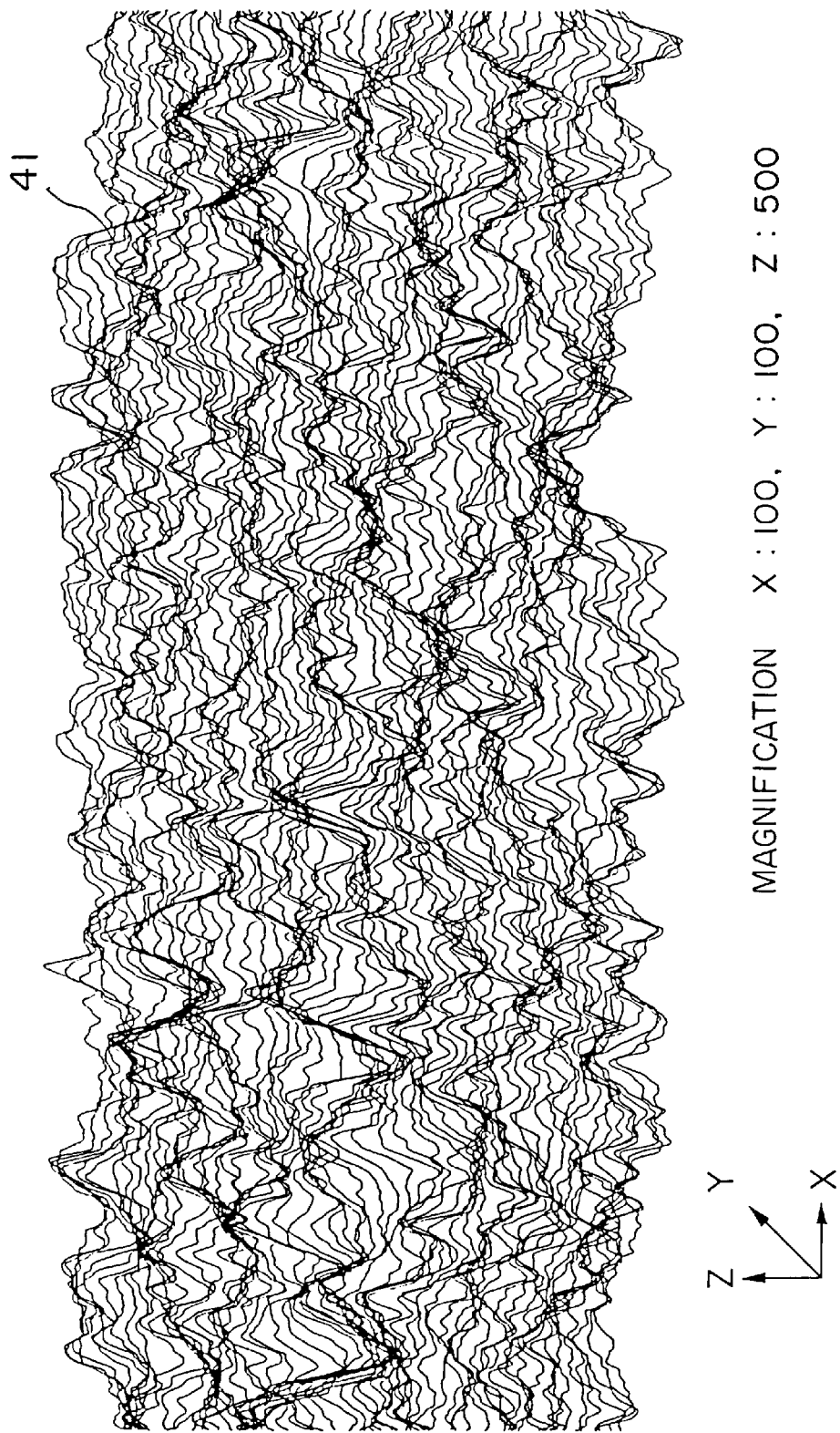
FIG. 26 is a partial expanded three-dimensional visualization of measurements showing the projections of a light-diffusing sheet used in this invention having the cumulative frequency distribution characteristics of FIG. 25.

As can be seen from the shapes of the imprinted projections 41 shown in FIG. 26, the above characteristic values show that the optical characteristics were good.

EXAMPLE 4

A light-diffusing sheet 8 was fabricated under the same conditions as those of Example 1, with the fabrication conditions of the roll mold alone being changed.

Figure 27:
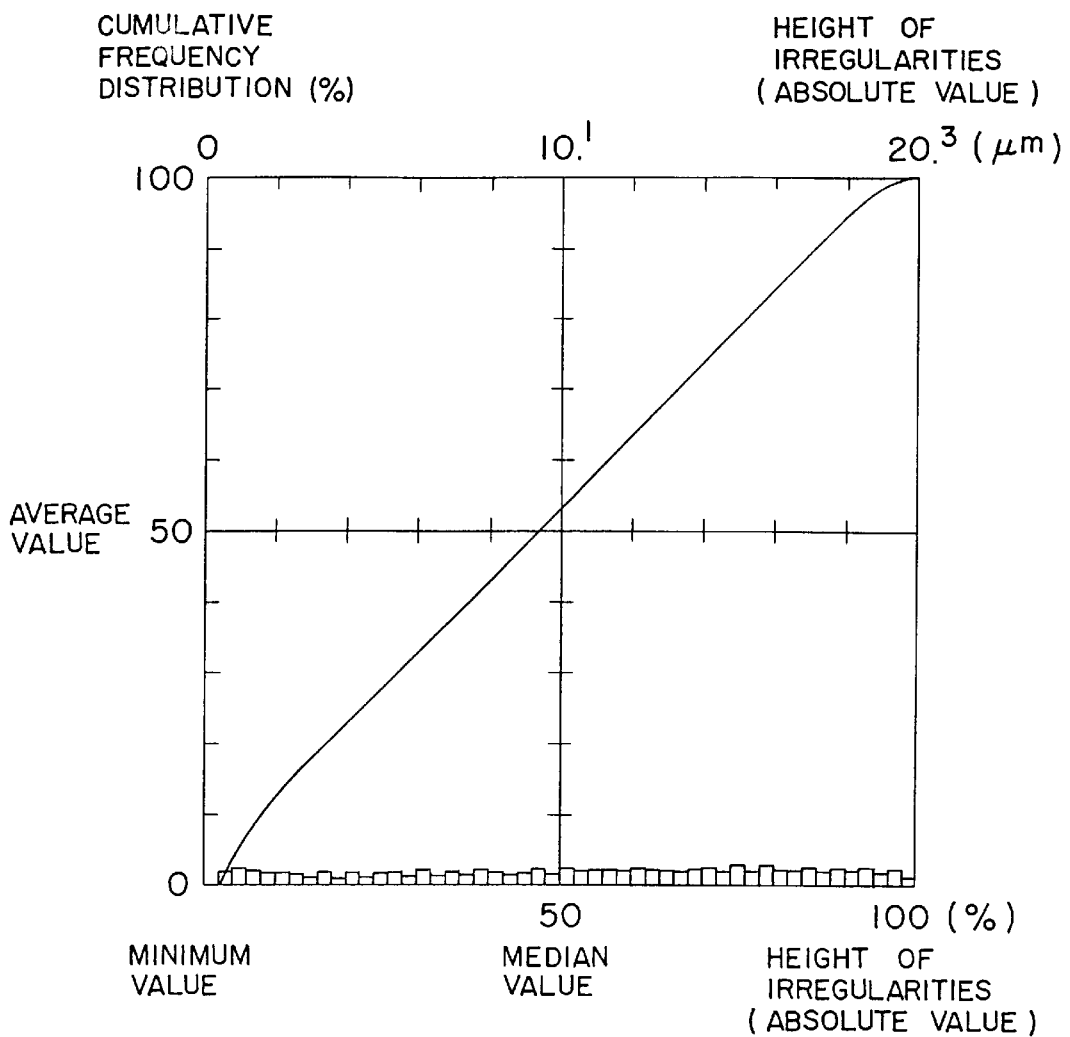
FIG. 27 is a graph showing the heights of projections of the light-diffusing sheet used in this invention (that is, the surface roughness of the light-diffusing sheet) and the distribution thereof as a cumulative frequency distribution curve f(R), with surface roughness (that is, the percentage of cumulative frequency distribution of heights R of the peaks) plotted along the X-axis and surface roughness (that is, the heights R of the peaks) plotted along the Y-axis, in a case in which the cumulative frequency distribution curve is linear.
Figure 28:
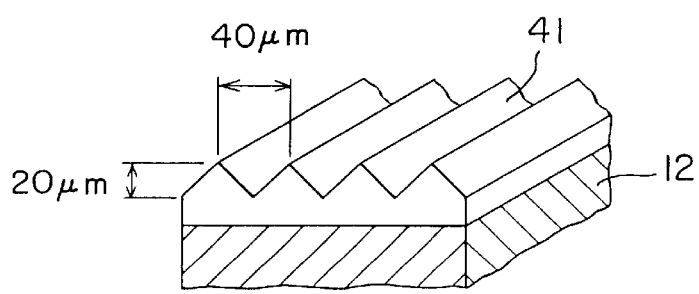
FIG. 28 is a partial enlarged perspective view of projections of a light-diffusing sheet formed of ridges of a rectangular equilateral triangular sectional shape and having the cumulative frequency distribution curve of FIG. 27.

In the roll mold used for Example 4, ridges of a rectangular equilateral triangular sectional shape were formed by incising a cylindrical metal mold surface with a machine tool. The thus obtained projections 41 exhibited a linear cumulative frequency distribution curve, as shown in FIG. 27. This curve defines a critical condition between the curves fA(R) and fB(R) of FIG. 17, but, since the projections 41 are shaped as shown in FIG. 28, the separation capability thereof is good.

The metal mold used for Example 5 was fabricated by an electroforming method using a molded film of polyethylene terephthalate into which particles of calcium carbonate having diameters of 1 to 10 $\mu$m were kneaded. The characteristics of the thus obtained projections 41 were as follows:

Total applied thickness: 40 $\mu$m

Surface roughness Rz: 2.16 $\mu$m
(ten-point average roughness, JIS-B-0601)

Haze: 32.5 (JIS-K-7105)

Surface area/measured area: 1.012211

Surface glossiness: 55.3 (JIS-Z-8741)

Figure 32:
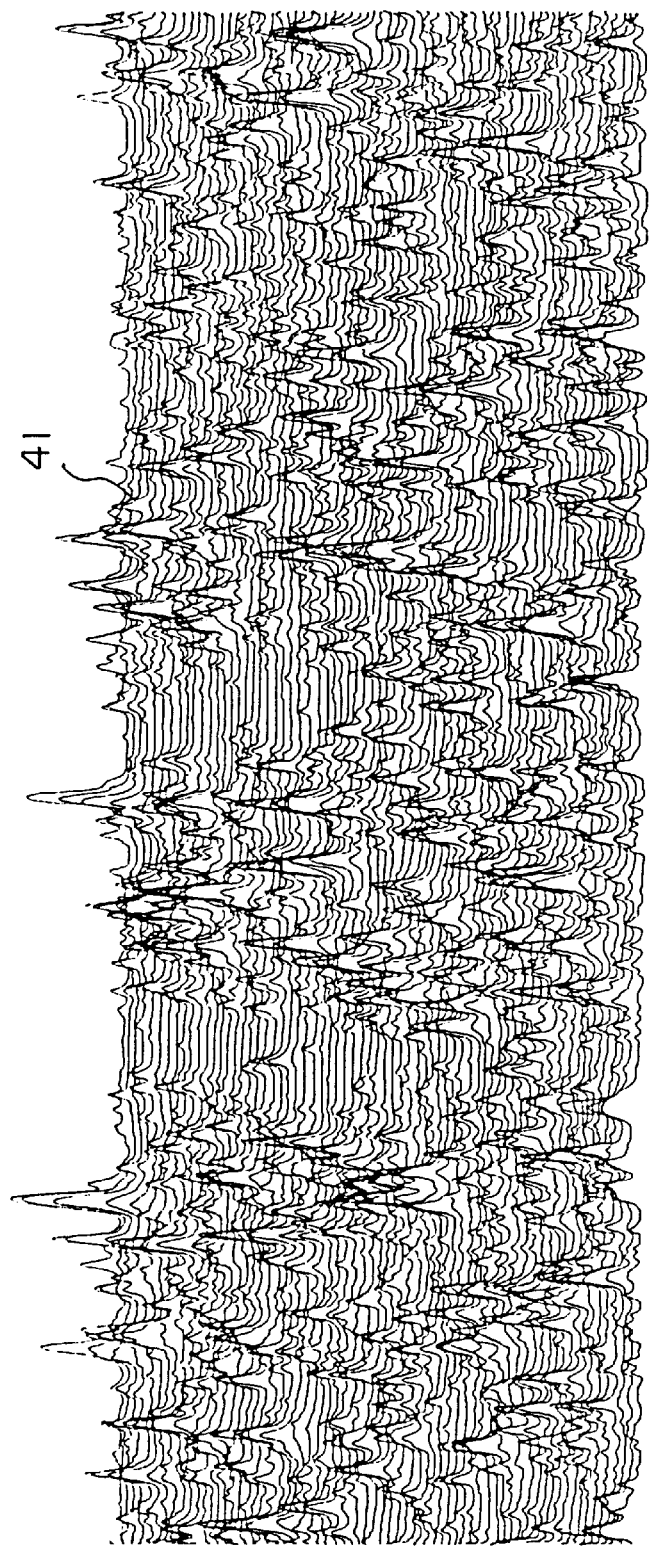
FIG. 32 is a partial expanded three-dimensional visualization of measurements showing the projections of a light-diffusing sheet used in this invention having the cumulative frequency distribution characteristics of FIG. 32.

The cumulative frequency distribution curve for Example 5, as shown in FIG. 31, exhibited a downward convexity over the entire region thereof, and the shape of the projections 41 was as shown in FIG. 32. The optical characteristics and mold separation capability of this light-diffusing sheet 8 were good.

The characteristics of the light-diffusing sheets 8 obtained as Examples 1 to 5 are summarized in Table 1.

TABLE 1

| | Example 1 | Example 2 | Example 3 | Example 4 | Example 5 | Comparative Example 1 |
|---|---|---|---|---|---|---|
| Haze value (%) JIS-K-7105 | 88.8 | 78.1 | 89.5 | | 32.5 | 82.6 |
| Gloss value (%) JIS-Z-8741 | 11.3 | 11.2 | 12.5 | | 55.3 | 15.0 |
| Surface Area/Measurement Area | 1.230832 | 1.019303 | 1.104595 | | 1.012211 | 1.012296 |
| Surface roughness Rz JIS-B-0601 | 38.4 $\mu$m | 5.62 $\mu$m | 16.1 $\mu$m | | 2.66 $\mu$m | 3.72 $\mu$m |
| Concealing of Dots on Rear Surface of Optically Conductive Plate | ○ Virtually Invisible | x–xx Visible | x Visible | xx Visible | xx Visible | xx Visible |
| Total Light Transmissivity (%) | 84.5 | 90.5 | 87.4 | | 87.3 | 90.6 |
| Mold Separation Capability of Projections 41 during Fabrication | ◎ Extremely Good | ○ Good | Δ Slightly difficult, but Separation possible | ○ Good | ○ Good | x Separation impossible |

COMPARATIVE EXAMPLE 1

A light-diffusing sheet 8 was fabricated under the same conditions as those of Example 1, with the fabrication conditions of the roll mold alone being changed.

The roll mold used for Comparative Example 1 was fabricated by forming a matte (frosted) chrome layer over a cylindrical mold surface. The characteristics of the thus obtained projections 41 were as follows:

Total applied thickness: 40 $\mu$m

Surface roughness Rz: 3.72 $\mu$m
(ten-point average roughness, JIS-B-0601)

Haze: 82.6 (JIS-K-7105)

Surface area/measured area: 1.012296

Surface glossiness: 15.0 (JIS-Z-8741)

Figure 30:
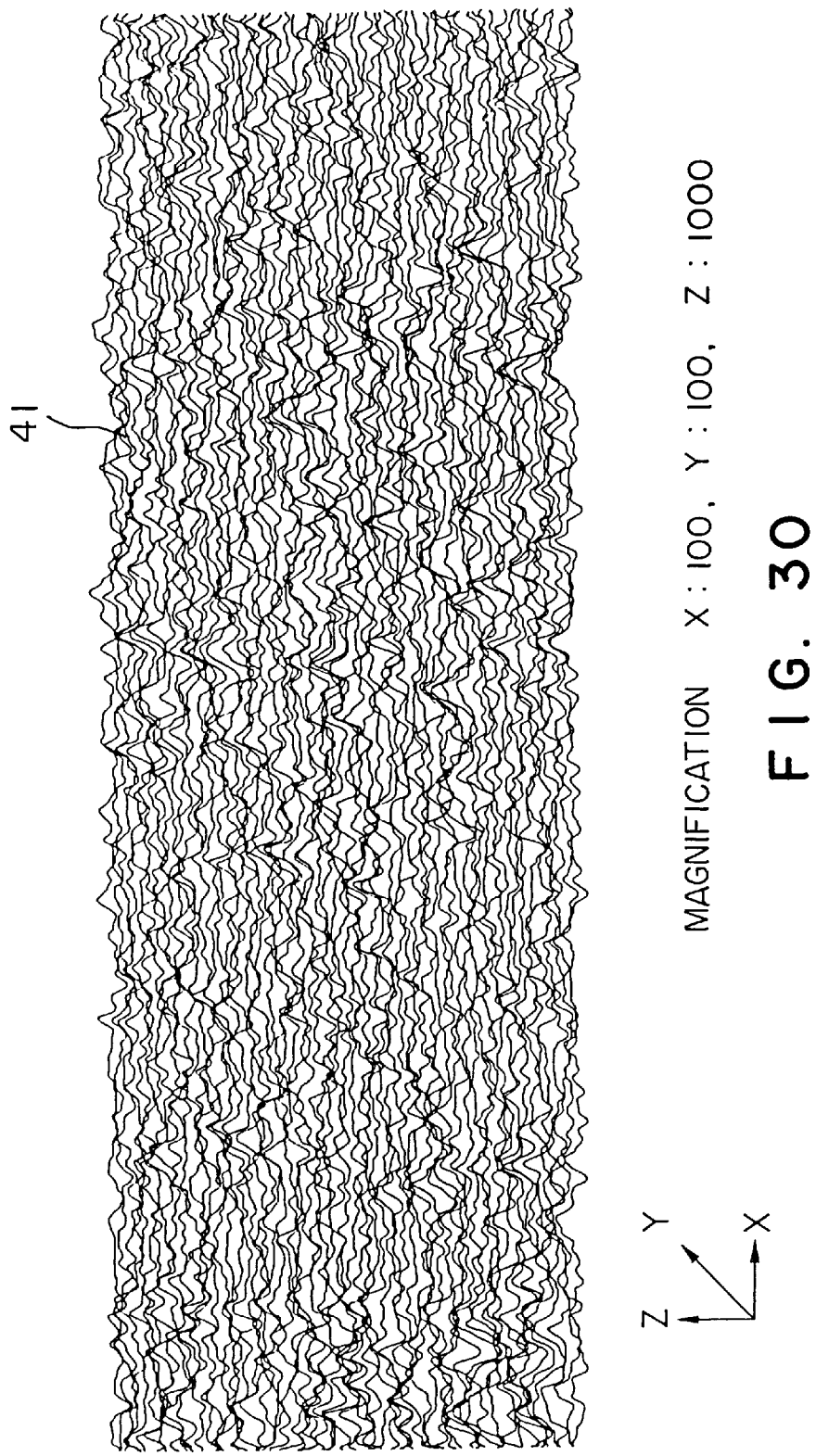
FIG. 30 is a partial expanded three-dimensional visualization of measurements showing the projections of a light-diffusing sheet used in this invention having the cumulative frequency distribution characteristics of FIG. 29.

The cumulative frequency distribution curve for Comparative Example 1 is shown in FIG. 29. This curve has a partial upwardly-convex portion and a partial downwardly-convex portion, and the average value is less than the median value. In this case, the sectional shape of the projections 41 is as shown in FIG. 30, and the separation capability thereof was bad.

EXAMPLE 5

A light-diffusing sheet 8 was fabricated under the same conditions as those of Example 1, with the fabrication conditions of the mold alone being changed.

EXAMPLE 6

Fabrication Process for Lens Sheet 4

Figure 12:
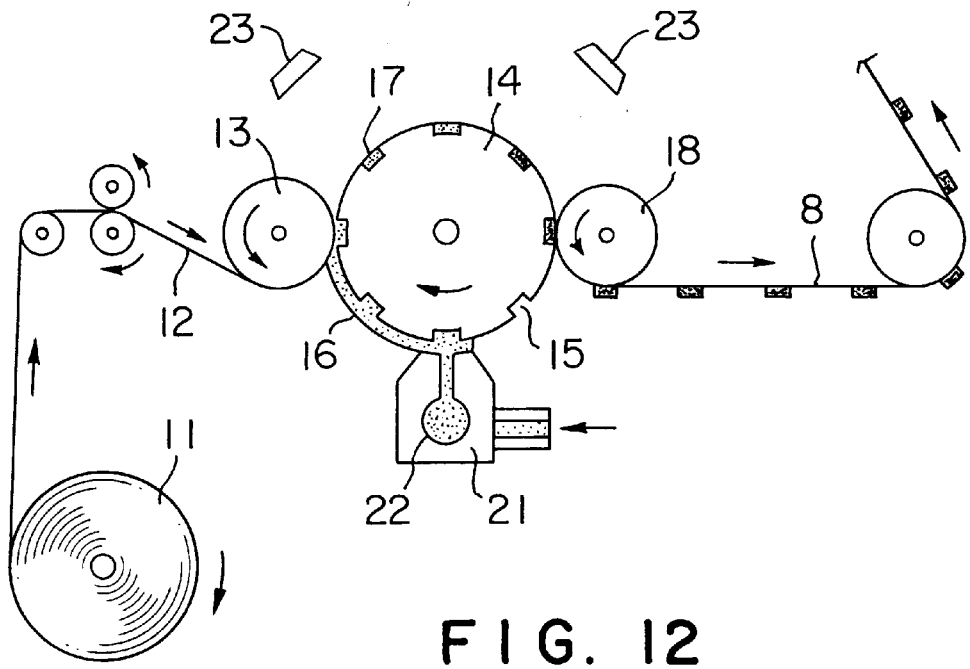
FIG. 12 shows an example of the method of fabricating the light-diffusing sheet of the present invention.

An apparatus similar to that of FIG. 12 used to fabricate the light-diffusing sheet 8 (except for details such as the fabrication roll mold) was used to fabricate the lens sheet 4, by the following process:

1. A stock roll 11 of base film 12, which is a bidirectionally oriented, 100-$\mu$m thick, colorless, transparent strip of polyethylene terephthalate, was prepared.

2. A roll mold 14 was prepared, this roll mold 14 being provided with inverted shapes 15 that are the inverse of elliptical cylindrical lenses (of the same shape, but with the concavities and convexities inverted) in the cylindrical metal surface thereof. While this roll mold 14 was rotated about a central axis thereof, an ultraviolet-curable resin 16 was supplied to the surface thereof from a T-die type of nozzle 21, to cover the inverted lens shapes sufficiently.

3. The base film 12 was pulled from the stock roll 11 at an extraction speed synchronized with the peripheral speed of the roll mold 14 and a lens sheet 4 of elliptical cylindrical lenses was obtained using the same apparatus and resin as that used in the process of fabricating the light-diffusing sheet 8. The lens sheet 4 was rolled up as is, and was subsequently cut to the desired dimensions according to usage.

Characteristics of Lenses

Individual elliptical cylindrical lenses (with major axes aligned with the normal to the lens sheet)

Length of major axis, 2b: 230 $\mu$m

Length of minor axis, 2a: 128 μm

Ratio of major/minor axes, 2b/2a: 1.80

Pitch p of lens units: 110 μm

Amount of cut-out (length along major axis of individual elliptical cylindrical lenses), D: 50 μm

EXAMPLE 7

The light-diffusing sheet 8 fabricated as Example 1 and the lens sheet 4 fabricated as Example 6 were used to create an edge-lit flat light source of the configuration shown in FIG. 1.

Note, however, that two lens sheets 4 were superimposed with the ridges thereof crossing orthogonally, with both lens surfaces facing the direction in which light is emitted.

The following components were used as the optically conductive plate 1 and the light source 3:

Optically Conductive Plate

Material: Polymethyl methacrylate copolymer resin

Shape: Rectangular flat plate, 4 mm thick

Front surface: Finished to a smoothness having average centerline roughness Rz of less than 0.1 μm over the entire surface Rear surface: Circular dot pattern in matte, transparent ink printed over rear surface of optically conductive plate 1, then polymethyl methacrylate film on rear surface thereof covered with aluminum by vacuum deposition to form mirrored reflective film.

Dots formed by silk-screening with a fine silica powder dispersed in an acrylic resin binder.

Dots arrayed at a pitch of 5 mm in both the longitudinal and lateral directions.

Diameter of dots 0.2 mm at locations close to the light source, gradually increasing with distance from light source until 2.0 mm at opposite side to light source.

Light Source

Cold-cathode white fluorescent lamps (power consumption 4 W, tube diameter 3 mm), arranged on two side edges of optically conductive plate. Metal reflective mirrors arranged on sides thereof opposite to optically conductive plate.

Figure 33:
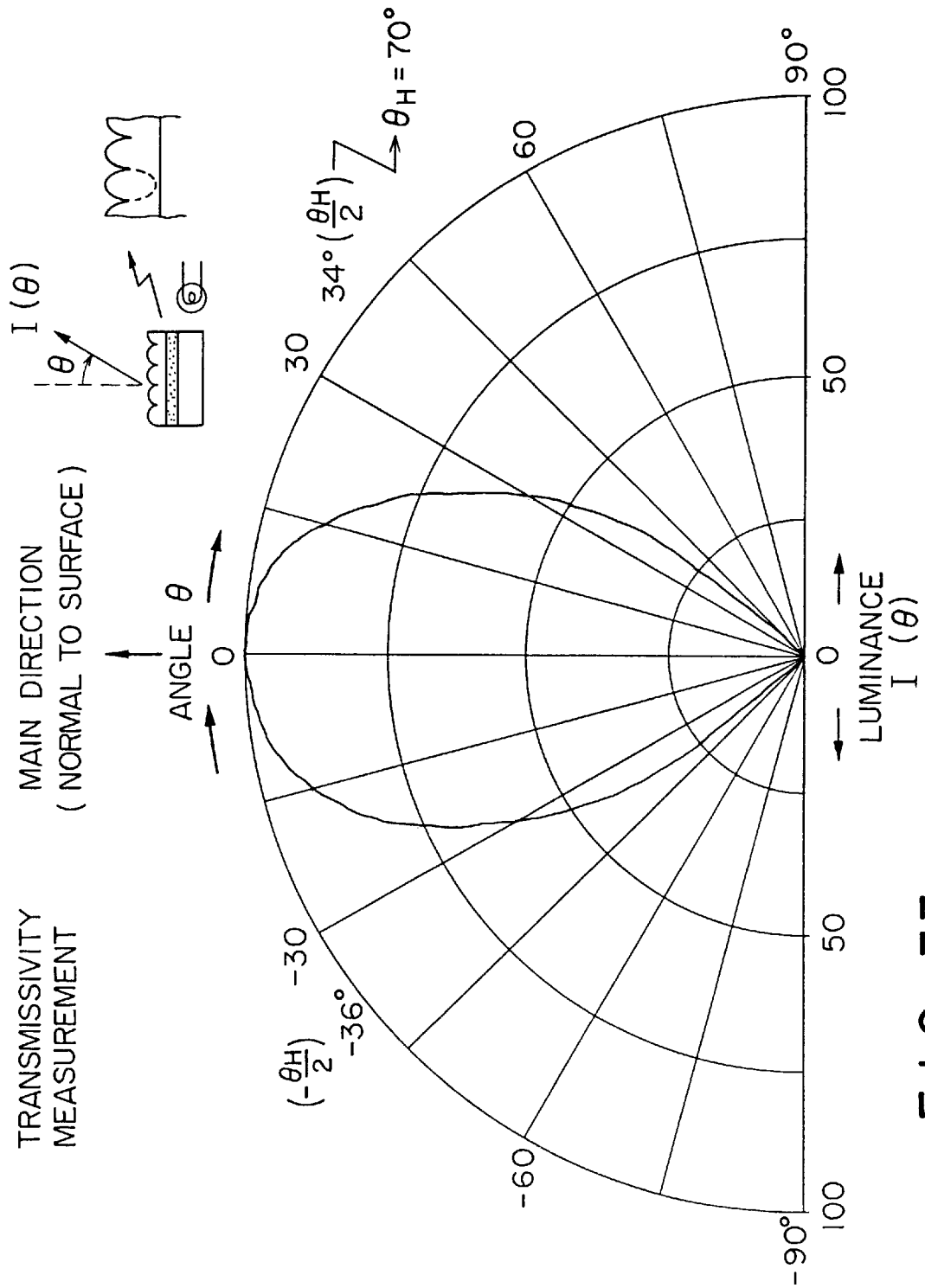
FIG. 33 shows the angular distribution of luminance of a light-emitting surface of a flat light source (Example 1 and Comparative Example 1)

The characteristics of the flat light source of the above configuration were as follows:

* Angular distribution of luminance as shown in FIG. 33
* Half-angle (θh): 72 degrees
* Luminance in normal direction (at center of optically conductive plate): 2025 cd/m2
* Distribution within light-emitting surface of luminance in normal direction: within ±5%. Substantially uniform, visually.

EXAMPLE 8

The configuration of Example 7 was used, but without the lens sheet 4 and using only the light-diffusing sheet 8 fabricated as in Example 1.

All other details were the same as those of Example 7.

Figure 34:
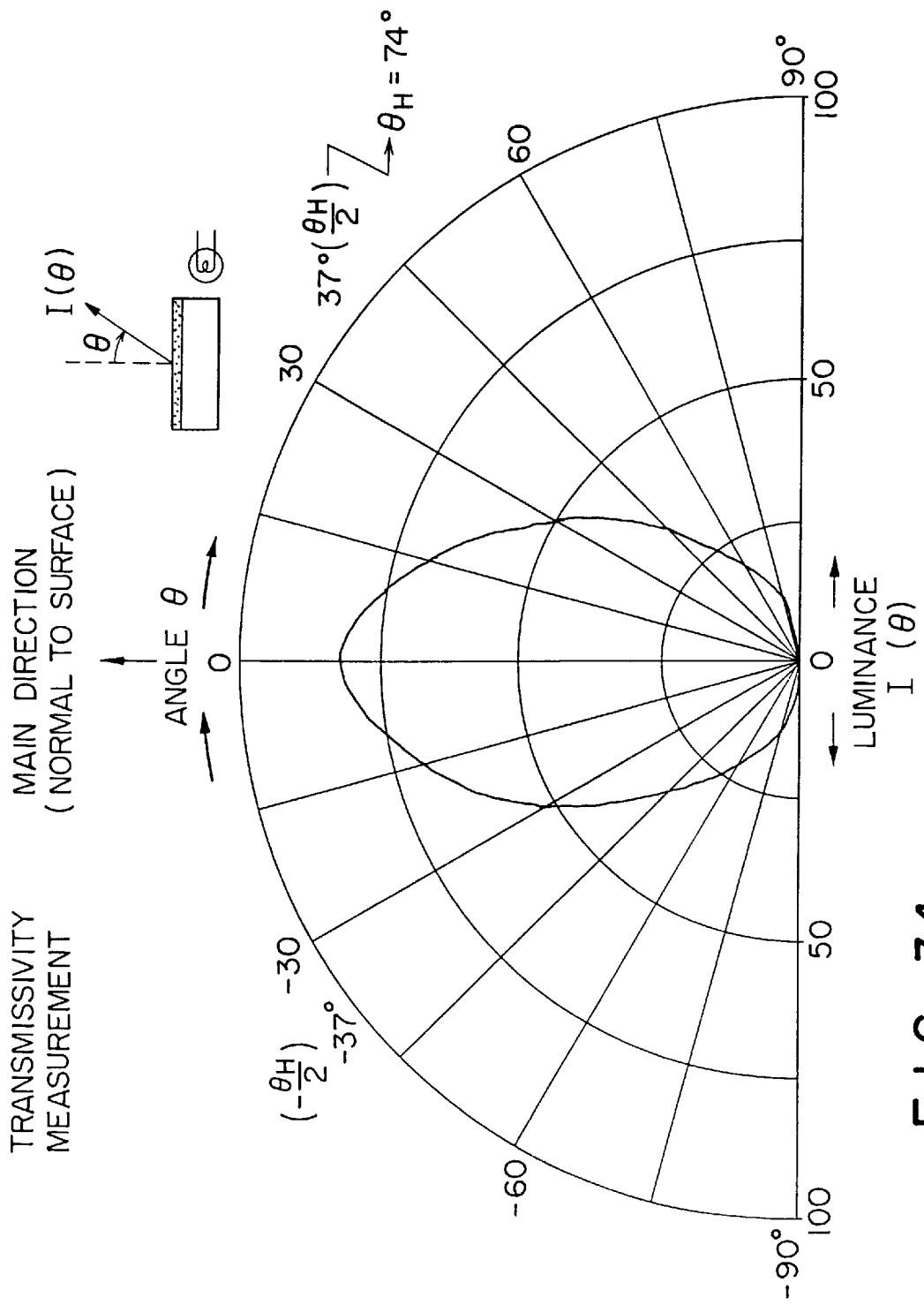
FIG. 34 shows the angular distribution of luminance of a light-emitting surface of another flat light source (Example 8) of this invention.

The characteristics of the flat light source of the above configuration were as follows:

* Angular distribution of luminance was as shown in FIG. 34.
* Half-angle (θh): 74 degrees (But note, however, that emitted light is distributed outside this half-angle to a certain extent, without attenuating suddenly.)
* Luminance in normal direction (at center of optically conductive plate): 1497 cd/m2
* Distribution within light-emitting surface of luminance in normal direction: within +−5%. Substantially uniform, visually.
* No side lobes were generated.

COMPARATIVE EXAMPLE 2

The configuration of Example 7 was used, where the light-diffusing sheet was a bidirectionally oriented, 100-μm thick, colorless, transparent strip of polyethylene terephthalate, covered on both sides with a 10-μm thick layer of an ultraviolet-curable acrylate resin coating into which was added silica particles having diameters of 1 to 10 μm, as a matte agent. The average roughness Rz of these surfaces was 3.0 μm.

* Angular distribution of luminance was the same as that shown in FIG. 34, however:
* Half-angle (θh): 76 degrees
* Luminance in normal direction: 1114 cd/m2
* Distribution within light-emitting surface of luminance in normal direction: within ±5%

COMPARATIVE EXAMPLE 3

The configuration of Example 7 was used, but the flat light source was fabricated without light-diffusing sheet 8. The ten-point average roughness of the rear surface of the lens sheet was such that: Rz≦0.1 μm.

The capabilities of the flat light source of this configuration were such that the luminance in the direction normal to the light-emitting surface was high in the vicinity of the side edge portion close to each light source, but the luminance dropped dramatically with distance from the light source so that a visibly darker region was formed in a portion that was (distance/total length of the optically conductive plate)=0.2 from the light source.

The following effects can be achieved by the flat light source of the present invention and a display device using this light source:

1. Since the light-diffusing sheet 8 is fabricated from a transparent material containing absolutely no particles of a light-diffusing agent, there is no energy absorption loss due to such a light-diffusing agent, which improves the utilization ratio of the energy of the light source and thus enables the implementation of a high level of luminance.

2. Projections of heights that are at least the wavelength of the light from the light source are formed on the surface of the light-diffusing sheet 8. When this light-diffusing sheet is placed on the smooth surface of the optically conductive plate 1 of an edge-lit light source, particularly that as claimed in claim 2, a gap of at least the wavelength of the light from the light source is formed reliably between the lens sheet 4 and the light-diffusing sheet 8 and/or between the light-diffusing sheet 8 and the optically conductive plate 1.

Therefore, there is nothing to prevent uniform distribution of the light from the light source throughout the entire optically conductive plate 1 due to total reflection of light at the front surface of the optically conductive plate 1, even when the lens sheet 4 is placed thereon, and thus a uniform and high level of luminance can be achieved over the entire light-emitting surface.

3. The light-diffusing effect of the light-diffusing sheet 8 ensures that the dot pattern of the light-scattering reflective layer on the rear surface of the optically conductive plate 1 is not visible, and thus a flat light source of a high quality can be obtained.

Furthermore, since the edge-lit flat light source used in this invention uses the light-diffusing sheet 8 and the lens sheet 4, the light emitted thereby can be distributed uniformly throughout a predetermined angular range, and a uniform luminance distribution can be achieved over the entire surface without concentrations of emitted light close to the light sources.

4. When the light-diffusing sheet 8 used in this invention is placed between the lens sheet 4 and the optically conductive plate 1 of an edge-lit flat light source, no optical sealing occurs between the lens sheet 4 and the optically conductive plate 1, and thus the generation of interference patterns such as Newton's rings can be prevented.

5. During the fabrication of the light-diffusing sheet 8 having minute irregularities formed at random over the front surface and/or rear surface thereof, a structure can be obtained that has a good mold-separation capability with respect to the roll mold used in the fabrication, so that a high-quality product can be fabricated efficiently.

We claim:

1. A flat light source comprising an optically conductive member having a front surface acting as a light-emitting surface and a rear surface, a light source provided adjacent to at least one edge of said optically conductive member and emitting a light of a wavelength, a reflective layer on said rear surface of the optically conductive member, and a light-diffusing sheet superimposed over said light-emitting surface of said optically conductive member, wherein said light-diffusing sheet comprises a transparent material free from light-diffusing agent particles; said light-diffusing sheet has a sheet surface facing said optically conductive member, said sheet surface having minute irregularities formed at random; and said minute irregularities include minute projections having heights from bottoms to tops thereof, said heights being at least said wavelength of the light but no more than 100 $\mu$m, and said heights being configured so that when a curve of a cumulative frequency distribution of said heights of the projections is plotted on coordinates having a Y-axis and an X-axis, with a percentage of the cumulative distribution curve taken along the Y-axis and with said heights taken along the X-axis, said curve has a convex portion oriented towards a lower side of the coordinates and an average value of said heights of the minute projections is greater than a median value thereof.

2. A flat light source as defined in claim 1, wherein said optically conductive member comprises a flat optically transmissive plate, and said front surface of the optically conductive member is a smooth surface having a surface roughness that is less than the wavelength of the light from said light source.

3. A flat light source as defined in claim 1, further comprising a lens array sheet having an array of individual lenses on a flat surface thereof, said lens array sheet being superimposed over said light-diffusing sheet.

4. A flat light source as defined in claim 1, further comprising a lens array sheet having an array of protuberant lenses on a flat surface thereof, said lens array sheet being superimposed over said light-diffusing sheet.

5. A flat light source as defined in claim 1, further comprising a second such light-diffusing sheet superimposed over said light-diffusing sheet.

6. A flat light source comprising a lamp housing having a front open window, side walls and a rear wall; at least one light source disposed in said lamp housing, an inner surface of said rear wall facing said light source acting as a light-reflecting surface, said light source emitting a light of a wavelength; and a light-diffusing sheet covering said window, wherein said light-diffusing sheet comprises a transparent material free from light-diffusing agent particles; said light-diffusing sheet has a sheet surface, said sheet surface having minute irregularities formed at random; and said minute irregularities include minute projections having heights from bottoms to tops thereof, said heights being at least said wavelength of the light but no more than 100 $\mu$m, and said heights being configured so that when a curve of a cumulative frequency distribution of said heights of the projections is plotted on coordinates having a Y-axis and an X-axis, with a percentage of the cumulative distribution curve taken along the Y-axis and with said heights taken along the X-axis, said curve has a convex portion oriented towards a lower side of the coordinates and an average value of said heights of the minute projections is greater than a median value thereof.

7. A flat light source as defined in claim 6, further comprising a lens array sheet having an array of individual lenses on a flat surface thereof, said lens array sheet being superimposed over said light-diffusing sheet.

8. A flat light source as defined in claim 6, further comprising a lens array sheet having an array of protuberant lenses on a flat surface thereof, said lens array sheet being superimposed over said light-diffusing sheet.

9. A flat light source as defined in claim 6, further comprising a second such light-diffusing sheet superimposed over said light-diffusing sheet.

10. A light-diffusing sheet for a light having a wavelength comprising:

a transparent material free from light-diffusing agent particles, said material having a surface having minute irregularities formed at random; and said minute irregularities include minute projections having heights from bottoms to tops thereof, said heights being at least said wavelength of the light but no more than 100 $\mu$m, said heights being configured so that when a curve of a cumulative frequency distribution of said heights of the projections is plotted on coordinates having a Y-axis and an X-axis, with a percentage of the cumulative distribution curve taken along the Y-axis and with said heights taken along the X-axis, said curve has a convex portion oriented towards a lower side of the coordinates and an average value of said heights of the minute projections is greater than a median value thereof.

11. A laminated light-diffusing sheet for a light having a wavelength comprising:

a light-diffusing sheet; and a lens sheet superimposed over said light-diffusing sheet, wherein said light-diffusing sheet comprises a transparent material free from light-diffusing agent particles; said light-diffusing sheet having a sheet surface, said sheet surface having minute irregularities formed at random; and said minute irregularities include minute projections having heights from bottoms to tops thereof, said heights being at least said wavelength of the light but no more than 100 $\mu$m, and said heights being configures so that when a curve of a cumulative frequency distribution of said heights of the projections is plotted on coordinates having a Y-axis and an X-axis, with a percentage of the cumulative distribution curve taken along the Y-axis and with aid heights taken along the X-axis, said curve has a convex portion oriented towards a lower side of the coordinates and an average value of said heights of the minute projections is greater than a median value thereof.

* * * * *